(12) United States Patent
Choi

(10) Patent No.: US 10,558,632 B2
(45) Date of Patent: Feb. 11, 2020

(54) DATA PROCESSING SYSTEM

(71) Applicant: SK hynix Inc., Gyeonggi-do (KR)

(72) Inventor: Hae-Gi Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 944 days.

(21) Appl. No.: 15/013,597

(22) Filed: Feb. 2, 2016

(65) Prior Publication Data
US 2017/0060923 A1    Mar. 2, 2017

(30) Foreign Application Priority Data

Sep. 1, 2015  (KR) .................. 10-2015-0123443

(51) Int. Cl.
*G06F 17/30*    (2006.01)
*G06F 16/22*    (2019.01)

(52) U.S. Cl.
CPC ................ *G06F 16/2246* (2019.01)

(58) Field of Classification Search
CPC .................................. G06F 16/2246
See application file for complete search history.

(56) References Cited

U.S. PATENT DOCUMENTS

| | | | |
|---|---|---|---|
| 6,470,344 B1 * | 10/2002 | Kothuri | G06F 17/30592 707/696 |
| 7,363,284 B1 * | 4/2008 | Plasek | G06F 17/30327 |
| 10,095,425 B1 * | 10/2018 | Martin | G06F 3/0689 |
| 2002/0120617 A1 * | 8/2002 | Yoshiyama | G06F 17/30336 |
| 2007/0094310 A1 * | 4/2007 | Passey | G06F 11/2094 |
| 2009/0299973 A1 * | 12/2009 | Kataoka | G06F 17/3053 |
| 2011/0035359 A1 * | 2/2011 | Bendakovsky | G06F 11/1458 707/640 |
| 2012/0254252 A1 * | 10/2012 | Jin | G06F 17/30315 707/797 |
| 2015/0278024 A1 * | 10/2015 | Barman | H04L 67/1095 707/634 |

FOREIGN PATENT DOCUMENTS

KR    100745693    8/2007

* cited by examiner

*Primary Examiner* — Alicia M Willoughby
(74) *Attorney, Agent, or Firm* — IP & T Group LLP

(57) ABSTRACT

A data processing system may include: a memory system suitable for sorting a plurality of index data having a tree structure wherein each index data comprises information indicating a tree level thereof into a plurality of groups through a first and second sorting operations, the first sorting operation comprising sorting the index data based on their respective tree level information, the second sorting operation comprising sorting the index data based on the numbers of accesses to their respective index data, saving the groups into different storage regions; and a host suitable for managing a plurality of index data into said tree structure.

18 Claims, 24 Drawing Sheets

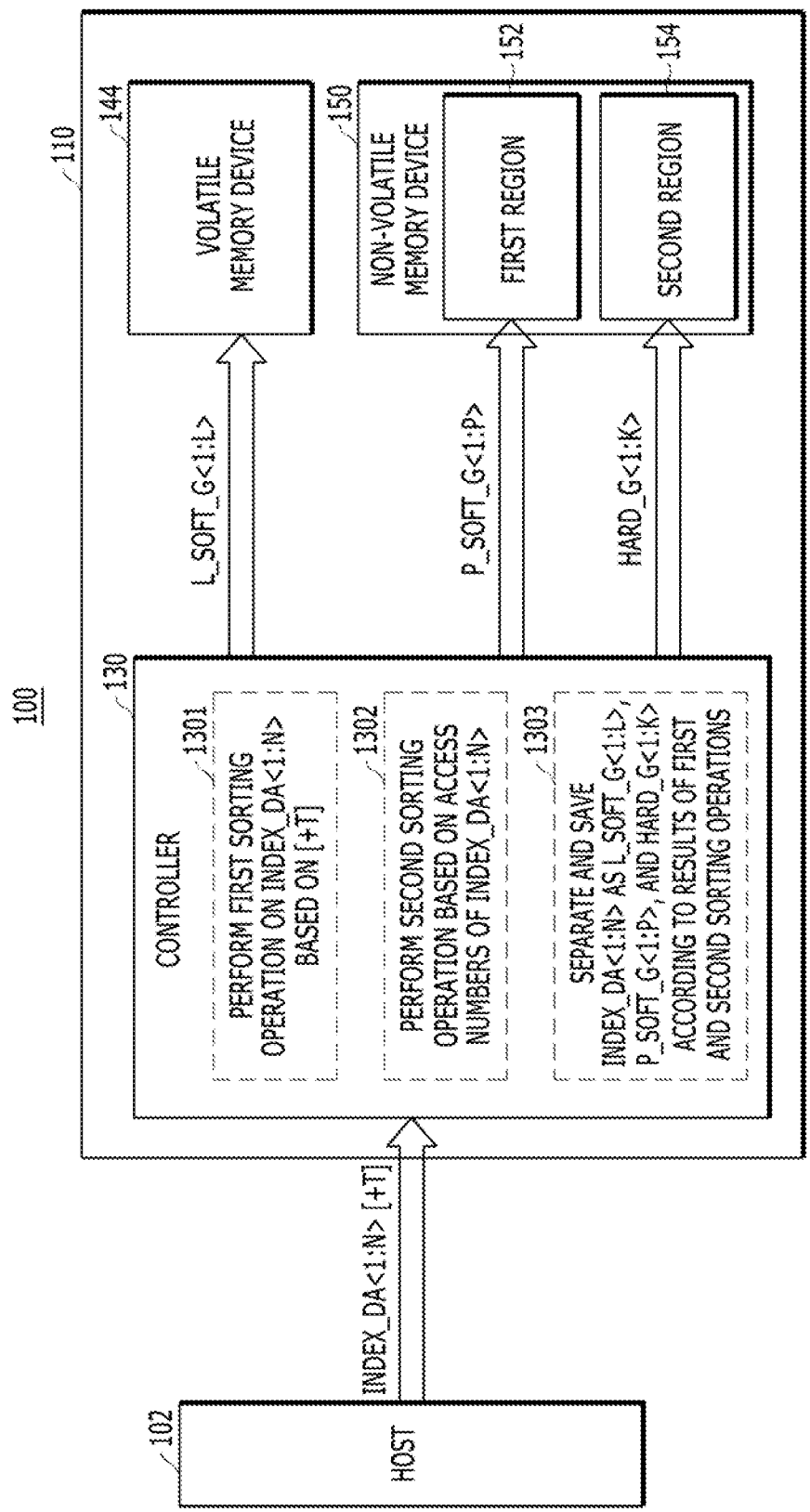

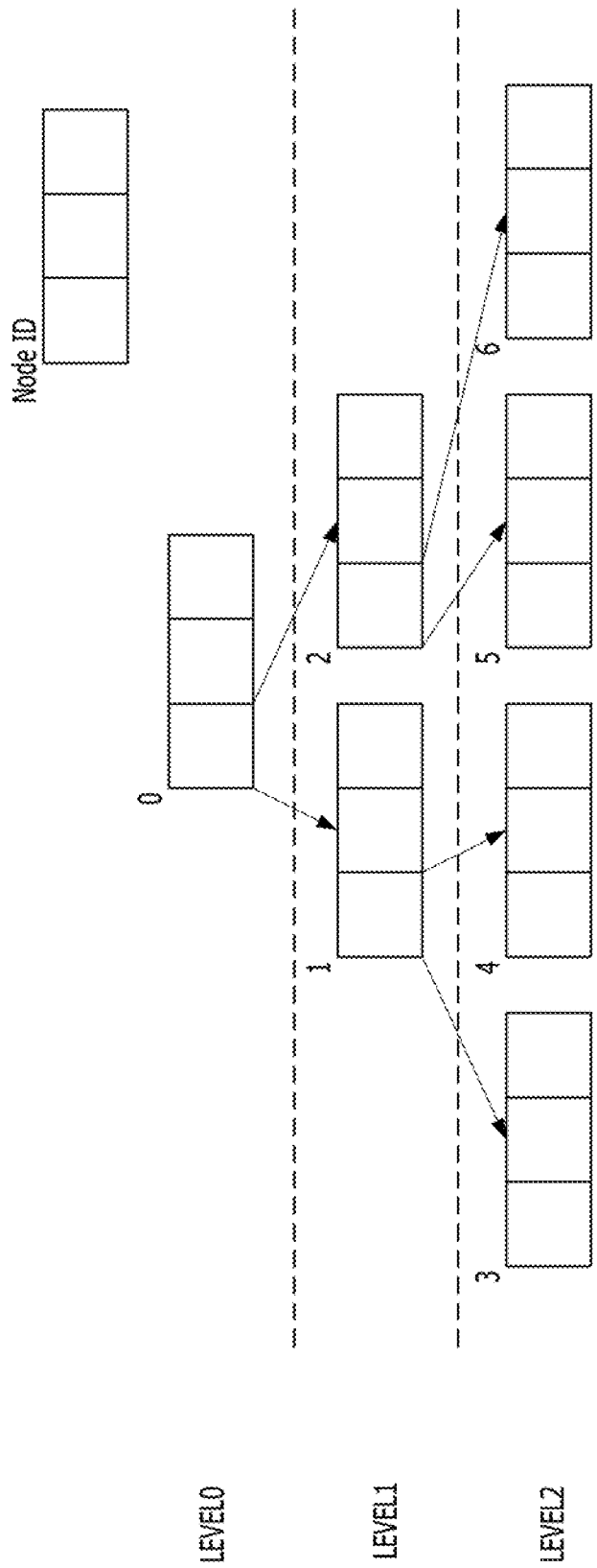

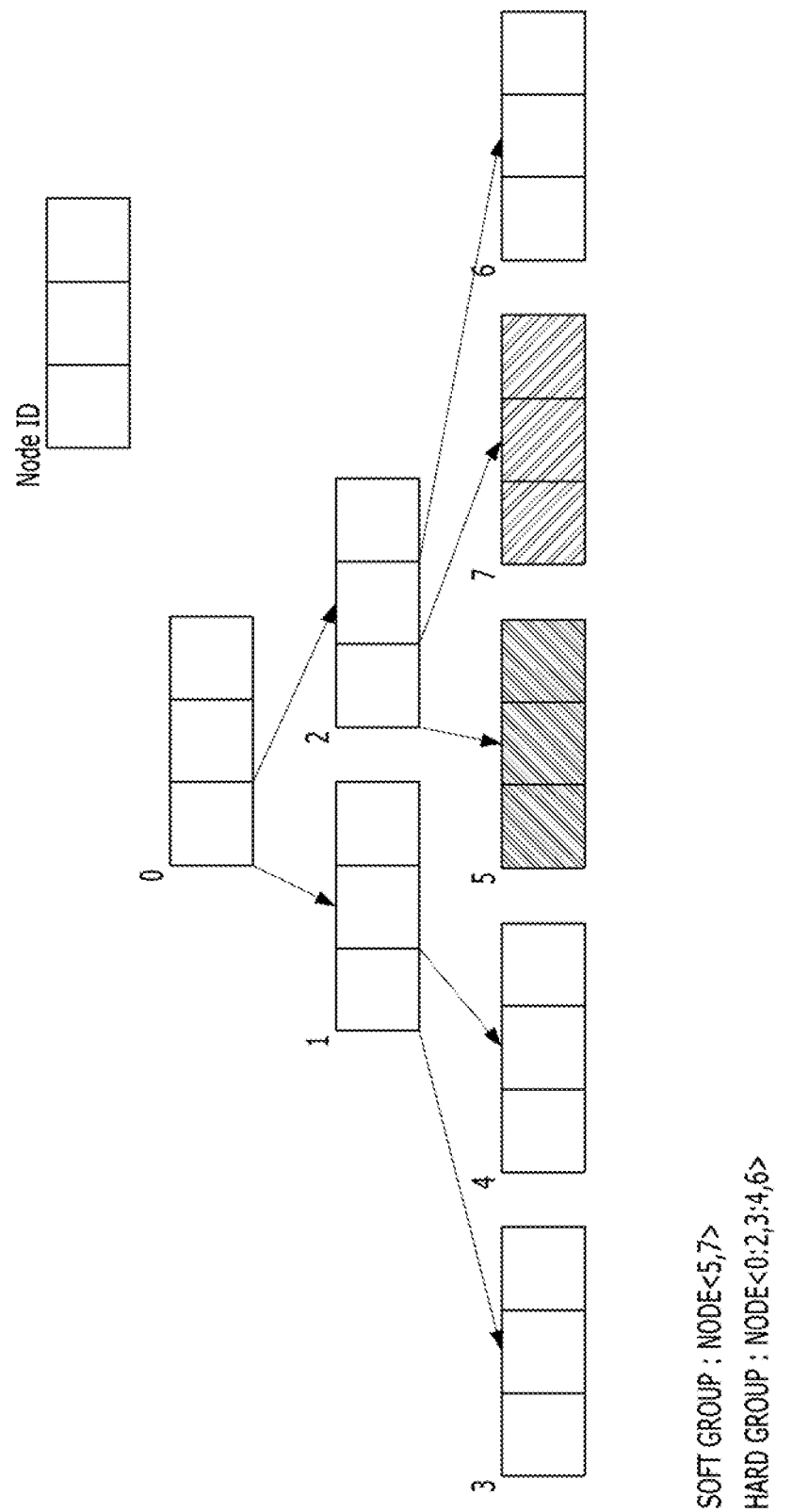

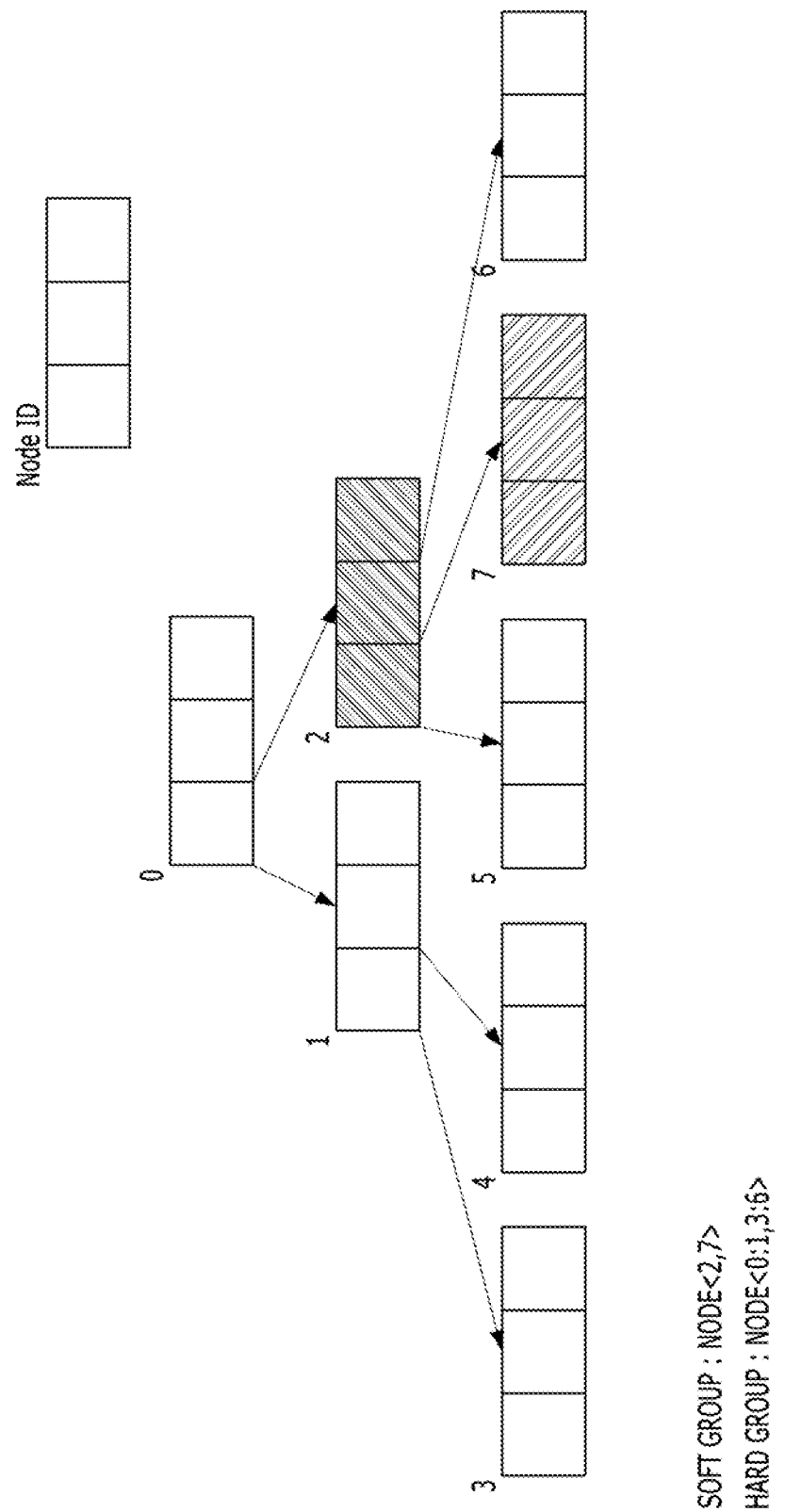

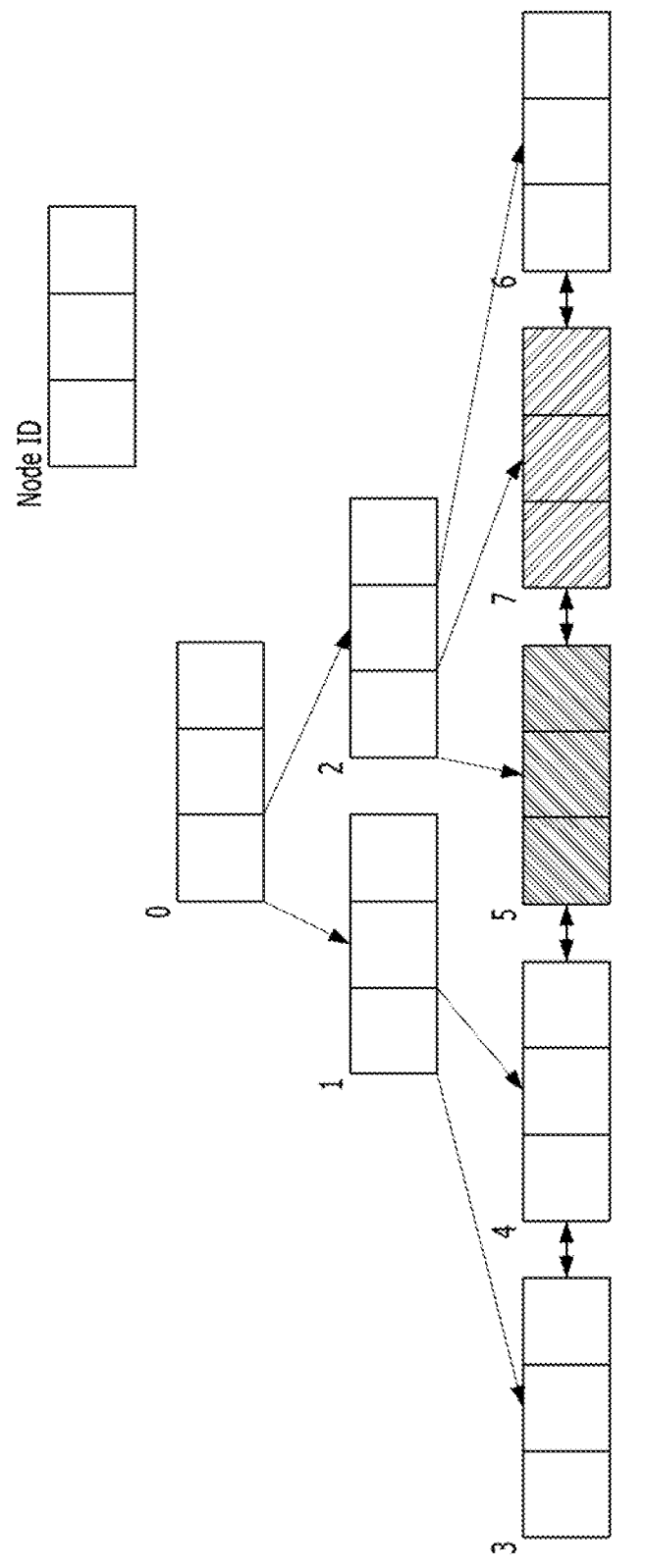

DATA PROCESSING SYSTEM

CROSS-REFERENCE TO RELATED APPLICATIONS

This application claims priority under 35 U.S.C. § 119 to Korean Patent Application No. 10-2015-0123443 filed on Sep. 1, 2015 in the Korean Intellectual Property Office, the disclosure of which is incorporated herein by reference in its entirety.

BACKGROUND

1. Field

The present invention relates generally to data processing systems and more particularly to a data processing system for managing a plurality of index data more efficiently.

2. Description of the Related Art

The computer environment paradigm has shifted to ubiquitous computing systems that may be used anytime and anywhere. Due to this fact, the use of portable electronic devices such as mobile phones, digital cameras, and notebook computers has rapidly increased. Portable electronic devices generally employ a memory system having one or more semiconductor memory devices used as main or auxiliary data storage devices.

Semiconductor memory devices generally provide excellent stability, durability, high information access speed, and low power consumption, since they have no moving parts. Well-known examples of semiconductor memory devices include universal serial bus (USB) memory devices, memory cards having various interfaces, and solid state drives (SSD).

SUMMARY

Various embodiments are directed to a data processing system capable of efficiently saving a plurality of index data managed in a tree structure.

In an embodiment, a data processing system may include: a memory system suitable for sorting a plurality of index data having a tree structure wherein each index data includes information indicating a tree level thereof into a plurality of groups through a first and second sorting operations, the first sorting operation comprising sorting the index data based on their respective tree level information, the second sorting operation comprising sorting the index data based on the numbers of accesses to their respective index data, saving the groups into different storage regions; and a host suitable for managing a plurality of index data into said tree structure.

The first sorting operation may include checking the tree information contained in the respective index data, and sorting the plurality of index data into a leaf group comprising index data having the deepest tree level, a parent group comprising index data connected to the index data included in the leaf group through a parent-child relationship, and a rest group comprising all remaining index data other than the index data included in the leaf and the parent groups.

The second sorting operation may include checking the number of accesses to the respective index data, and sorting the index data into a soft group formed by grouping data accessed a larger number of times than a preset number and a hard group formed by grouping data accessed a smaller number of times than the preset number.

The second sorting operation for new data among the plurality of index data may include sorting the new data into the soft group, when any one of data adjacent to the new data is included in the soft group, regardless of the number of accesses to the new data.

The adjacent data may include one of: data of the leaf group having a value within a preset range from the value of the new data, data of the parent group being connected to the new data through the parent-child relationship, and data of the leaf group being connected to the data of the parent group through the parent-child relationship, the data of the parent group being connected to the new data through the parent-child relationship.

The memory system may include: a first non-volatile memory device; a second non-volatile memory device; and a controller suitable for; sorting the index data through the first and second sorting operations, saving data included in the soft group into the second non-volatile memory device, and saving data included in the hard group into the first non-volatile memory device.

The memory system may include: a non-volatile memory device comprising first and second regions; a volatile memory device; and a controller suitable for; sorting the index data through the first and second sorting operations, saving data included in both of the leaf group and the soft group into the volatile memory device, saving data included in both of the parent group and the soft group into the first region of the non-volatile memory device, and saving data included in the hard group into the second region of the non-volatile memory device.

The second sorting operation may include sorting a part of the data sorted into the hard group into an additional soft group, the part of the data being accessed a larger number of times than a predetermined number while having a value within a preset range from the data included in the soft group, the predetermined number is lower than the preset number.

The memory system may include: a non-volatile memory device comprising first and second regions; a volatile memory device; and a controller suitable for; sorting the index data through the first and second sorting operations, saving data included in the soft group into the volatile memory device, saving data included in the additional soft group into the first region of the non-volatile memory device, and saving data included in the hard group into the second region of the non-volatile memory device.

The memory system may include: a non-volatile memory device comprising a hot block and a cold block; and a controller suitable for; sorting the index data through the first and second sorting operations, saving data included in the soft group into the hot block of the non-volatile memory device, and saving data included in the hard group into the cold block of the non-volatile memory device.

In an embodiment, a data processing system may include: a host suitable for managing a plurality of index data in a tree structure, and sorting the plurality of index data into a plurality of groups through a first sorting operation by sorting the plurality of index data based on tree levels of the respective index data and a second sorting operation by sorting the plurality of index data based on the numbers of accesses to the respective index data, the plurality of index data each containing group information indicating information on a group to which the index data belongs; and a memory system suitable for sorting the plurality of index data applied from the host into a plurality of groups according to the group information of the respective index data, and separating and saving the groups into different storage regions.

The first sorting operation may include sorting the plurality of index data into a leaf group formed by grouping data having the deepest tree level, a parent group formed by grouping data connected to the data included in the leaf group through the parent-child relationship, and a rest group formed by grouping the rest data excluding the data included in the leaf group and the parent group.

The second sorting operation may include: checking the numbers of accesses to the respective index data, and sorting the index data into a soft group formed by grouping data accessed a larger number of times than a preset number and a hard group formed by grouping data accessed a smaller number of times than the preset number.

The second sorting operation for new data among the plurality of index data may include sorting the new data into the soft group, when any one of data adjacent to the new data is included in the soft group, regardless of the number of accesses to the new data.

The adjacent data include one of: data of the leaf group which has a value within a preset range from the value of the new data, data of the parent group which is connected to the new data through the parent-child relationship, and data of the leaf group which is connected to the data of the parent group through the parent-child relationship, the data of the parent group being connected to the new data through the parent-child relationship.

The memory system may include: a first non-volatile memory device; a second non-volatile memory device; and a controller suitable for; saving the data included in the soft group into the second non-volatile memory device, and saving the data included in the hard group into the first non-volatile memory device, according to the group information contained in the respective index data.

The memory system may include: a non-volatile memory device comprising first and second regions; a volatile memory device; and a controller suitable for; saving data included in both of the leaf group and the soft group into the volatile memory device, saving data included in both of the parent group and the soft group into the first region of the non-volatile memory device, and saving data included in the hard group into the second region of the non-volatile memory device, according to the group information contained in the respective index data.

The second sorting operation may include sorting a part of the data sorted into the hard group into an additional soft group, the part of the data being accessed a larger number of times than a predetermined number while having a value within a preset range from the data included in the soft group, the predetermined number is lower than the preset number.

The memory system may include: a non-volatile memory device comprising first and second regions; a volatile memory device; and a controller suitable for; saving the data included in the soft group into the volatile memory device, saving the data included in the additional soft group into the first region of the non-volatile memory device, and saving the data included in the hard group into the second region of the non-volatile memory device, according to the group information contained in the respective index data.

The memory system may include: a non-volatile memory device comprising a hot block and a cold block; and a controller suitable for; saving the data included in the soft group into the hot block of the non-volatile memory device, and saving the data included in the hard group into the cold block of the non-volatile memory device, according to the group information contained in the respective index data.

BRIEF DESCRIPTION OF THE DRAWINGS

FIGS. 12A to 12C are block diagrams of a data processing system illustrating an operation of managing index data, according to an embodiment of the invention.

FIGS. 14A to 14F are diagrams illustrating examples of first and second data sorting operations, according to an embodiment of the invention.

DETAILED DESCRIPTION

Figure 1:
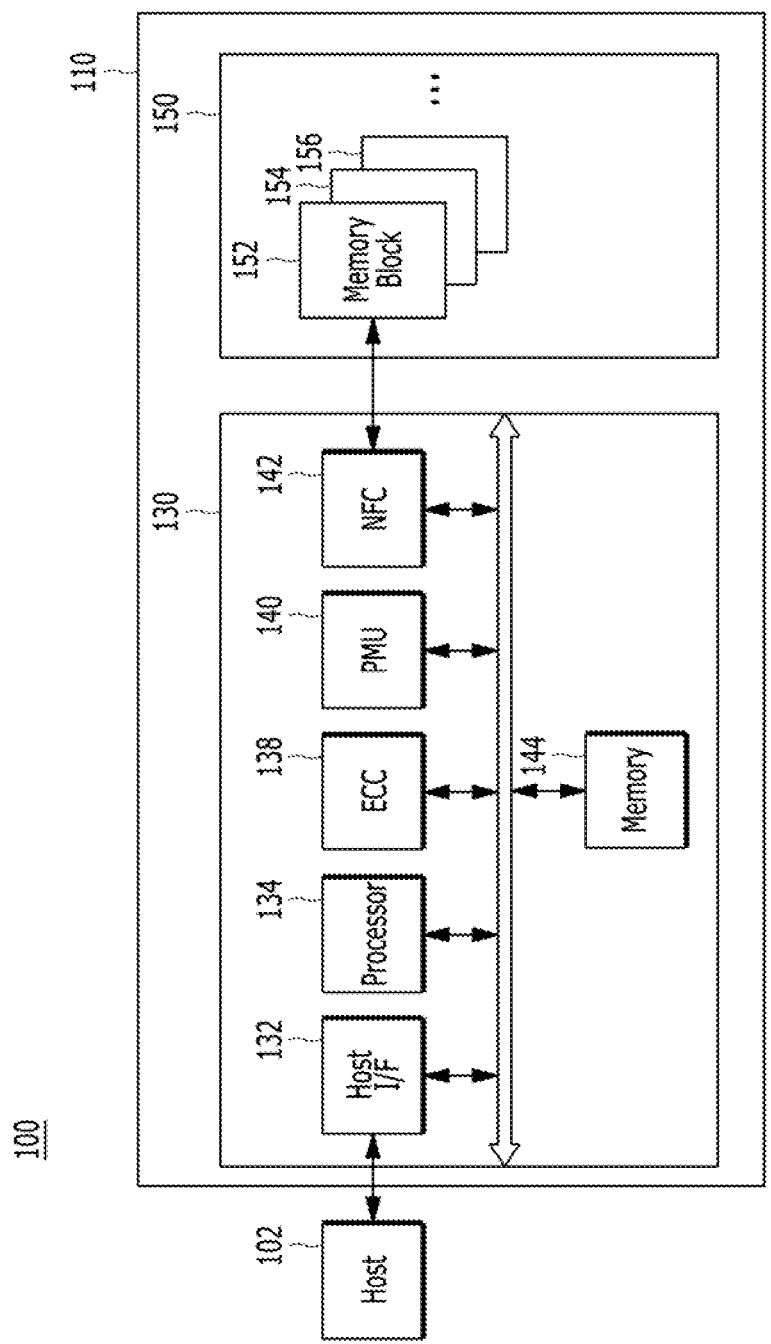
FIG. 1 is a diagram illustrating a data processing system including a memory system, according to an embodiment of the invention.

Various embodiments will be described below in more detail with reference to the accompanying drawings. It is noted, however, that the present invention may be embodied in different forms and should not be construed as being limited to the embodiments set forth herein. Rather, these embodiments are provided so that this disclosure will be thorough and complete, and will fully convey the invention to those skilled in the art to which this invention pertains. Also, throughout the disclosure, like reference numerals refer to like parts throughout the various figures and embodiments of the invention.

Referring now to FIG. 1, a data processing system 100 according to an embodiment of the invention is provided. The data processing system 100 may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102. For example, the memory system 110 may store data to be accessed by the host 102. The memory system 110 may be used as a main memory system or an auxiliary memory system of the host 102. The memory system 110 may be electrically coupled with the host 102 according to a protocol of a host interface. The memory system 110 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM), a static random access memory (SRAM) and the like. The storage devices for the memory system 110 may be implemented with a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM), and the like.

The memory system 110 may include a memory device 150 for storing data to be accessed by the host 102, and a controller 130 for controlling storage of data in the memory device 150.

The controller 130 and the memory device 150 may be integrated into one semiconductor device. For instance, the controller 130 and the memory device 150 may be integrated into one semiconductor device and configured as a solid state drive (SSD). When the memory system 110 is used as the SSD, the operation speed of the host 102 may be significantly increased.

The controller 130 and the memory device 150 may be integrated into a single semiconductor device, for example as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

The memory system 110 may be configured as a computer, an ultra-mobile PC (UMPC), a workstation, a netbook, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 may retain stored data when power supply is interrupted. The memory device 150 may store data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled.

The memory device 150 may be a nonvolatile memory device, for example, a flash memory. The memory device 150 may have a three-dimensional (3D) stack structure. In an embodiment, the memory device 150 may be a flash memory having a 3D stack structure. The structure of the memory device 150 including an example of a three-dimensional (3D) stack structure of the memory device 150 will be described later in detail with reference to FIGS. 2 to 11.

The controller 130 of the memory system 110 may control the memory device 150 in response to a request from the host 102. The controller 130 may control one or more of the overall operations of the memory device 150, such as read, write, program and erase operations. For example, the controller 130 may provide data read from the memory device 150, to the host 102, and store data provided from the host 102 into the memory device 150.

The controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) protocols and the like.

The ECC unit 138 may detect and/or correct errors in the data read from the memory device 150 during a read operation. The ECC unit 138 may not correct error bits when the number of the error bits may be greater than or equal to a threshold number of correctable error bits, and may output an error correction fail signal indicating a failure in correcting the error bits.

The ECC unit 138 may perform an error correction operation based on any suitable scheme, such as a coded modulation scheme including, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices for performing an error correction operation.

The PMU 140 may provide and manage power for the controller 130, for example, power for component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and the like.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fall seriously deteriorates the utilization efficiency of the memory device 150 having a 3D stack structure and the reliability of the memory system 100, and thus reliable bad block management is required.

Figure 2:
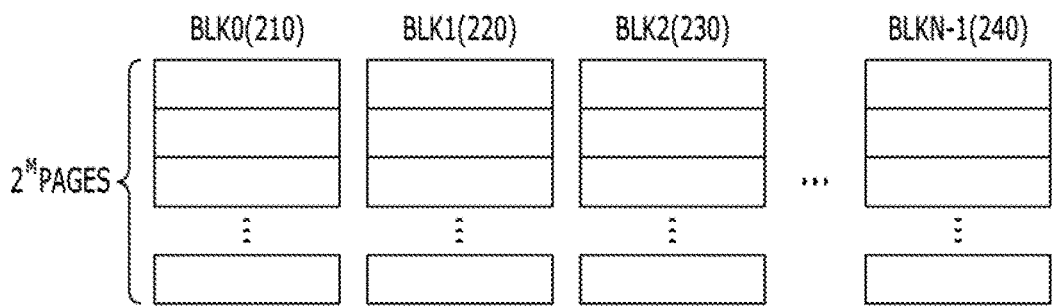
FIG. 2 is a diagram illustrating an example of a memory device employed in the memory system shown in FIG. 1.

FIG. 2 is a schematic diagram illustrating the memory device 150 shown in FIG. 1.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
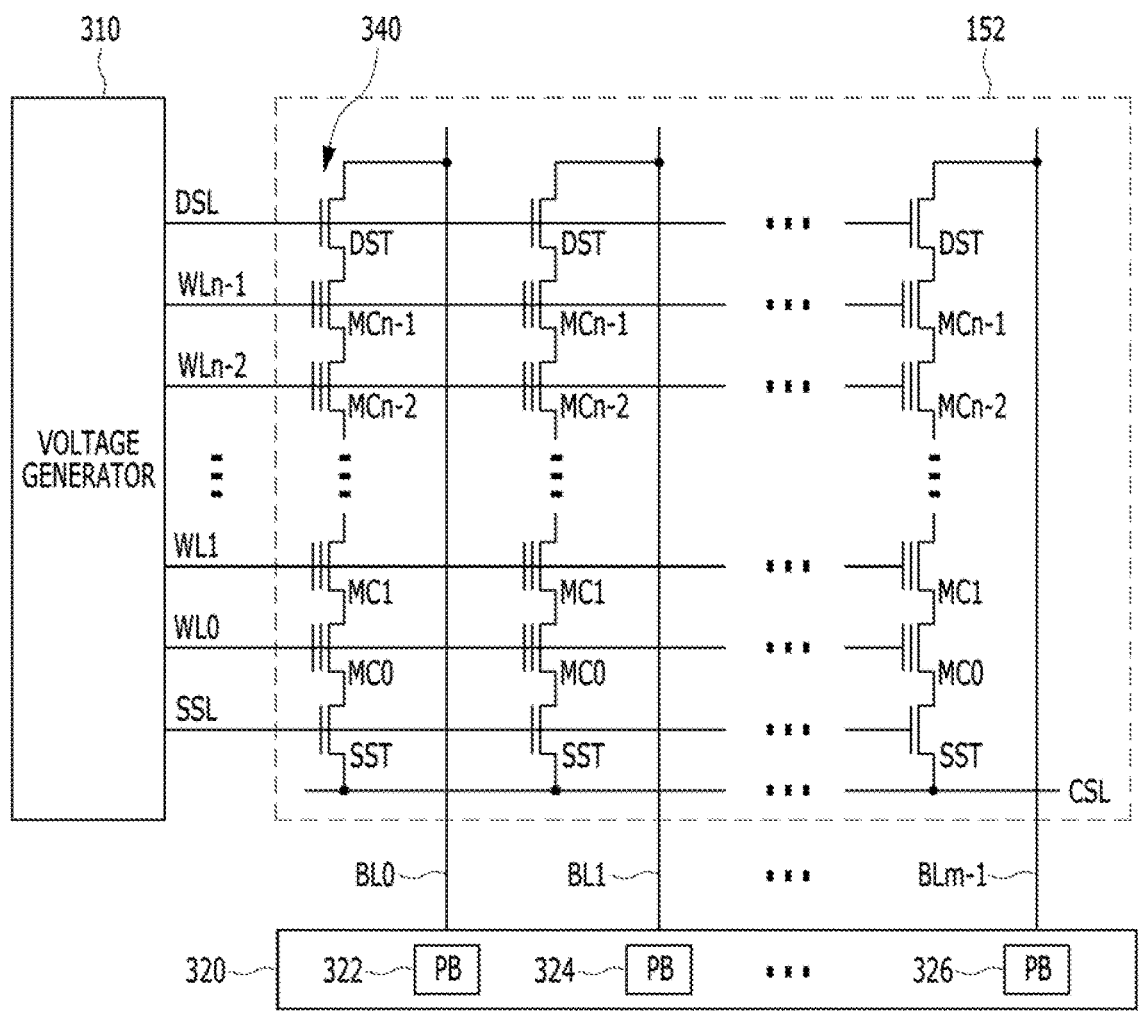
FIG. 3 is a circuit diagram illustrating an example of a memory block that may be employed in a memory device, according to an embodiment of the invention.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is noted that the memory block 152 is not limited to NAND flash memory only and may be realized by NOR flash memory, hybrid flash memory having at least two kinds of memory cells combined, or one-NAND flash memory having a controller built in a memory chip. The operational characteristics of a semiconductor device may be applied not only to a flash memory device having a charge storing layer configured by conductive floating gates but also to a charge trap flash (CTF) having a charge storing layer configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions having the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 corresponding to columns (or bit lines) or pairs of columns (or pairs of bit lines), respectively. A plurality of latches (not shown) may be included in each of the page buffers 322, 324 and 326.

FIGS. 4 to 11 are schematic diagrams illustrating the memory device 150 shown in FIG. 1.

Figure 4:
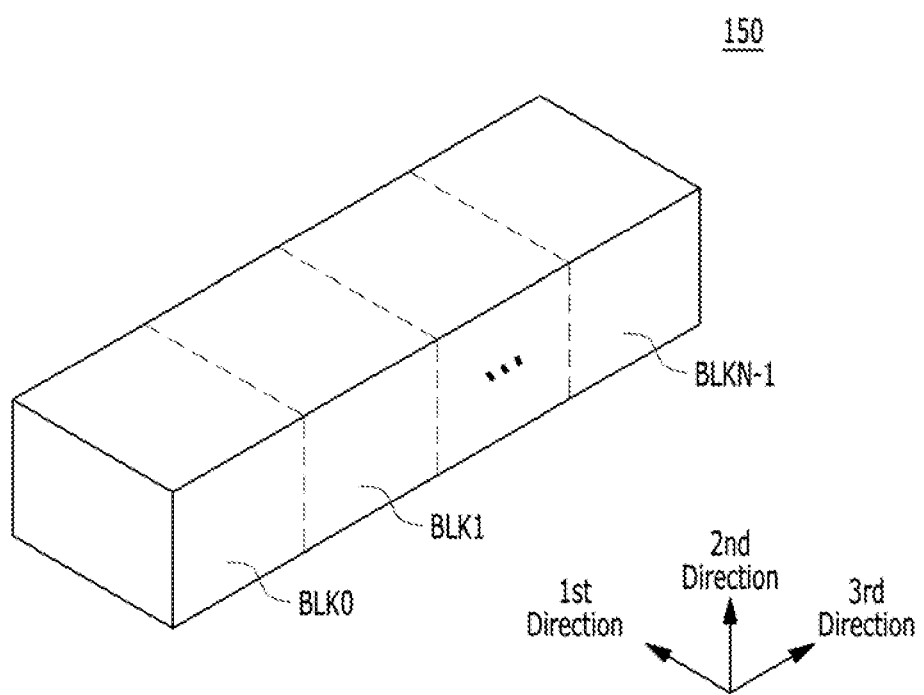
FIGS. 4 to 11 are diagrams illustrating examples of a memory device that may be employed in a memory device, according to various embodiments of the invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN−1, and each of the memory blocks BLK0 to BLKN−1 may be realized in a three-dimensional (3D) structure or a vertical structure. The respective memory blocks BLK0 to BLKN−1 may include structures extending in first to third directions, for example, an x-axis direction, a y-axis direction and a z-axis direction.

The respective memory blocks BLK0 to BLKN–1 may include a plurality of NAND strings NS extending in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, the respective memory blocks BLK0 to BLKN–1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
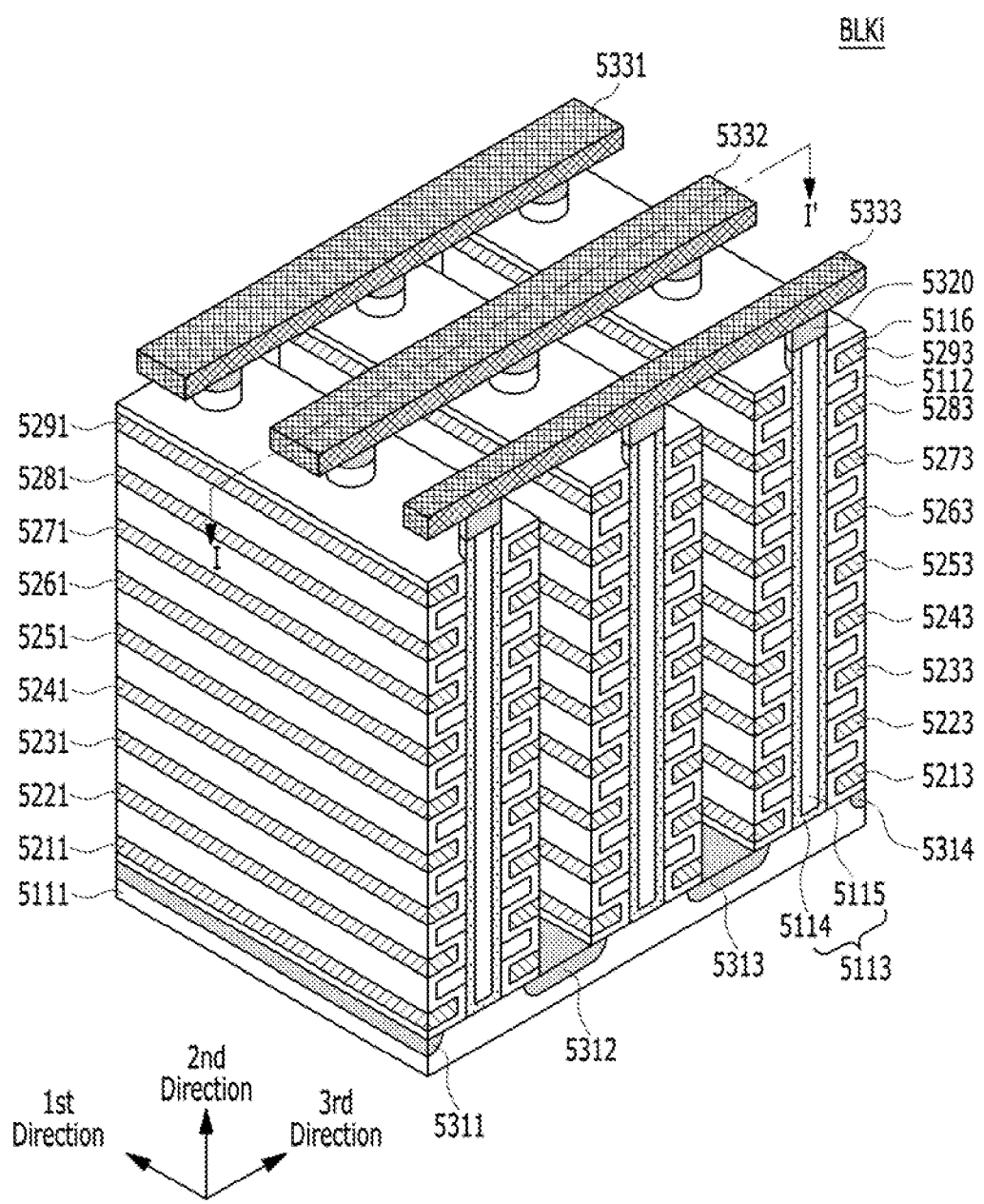
Figure 6:
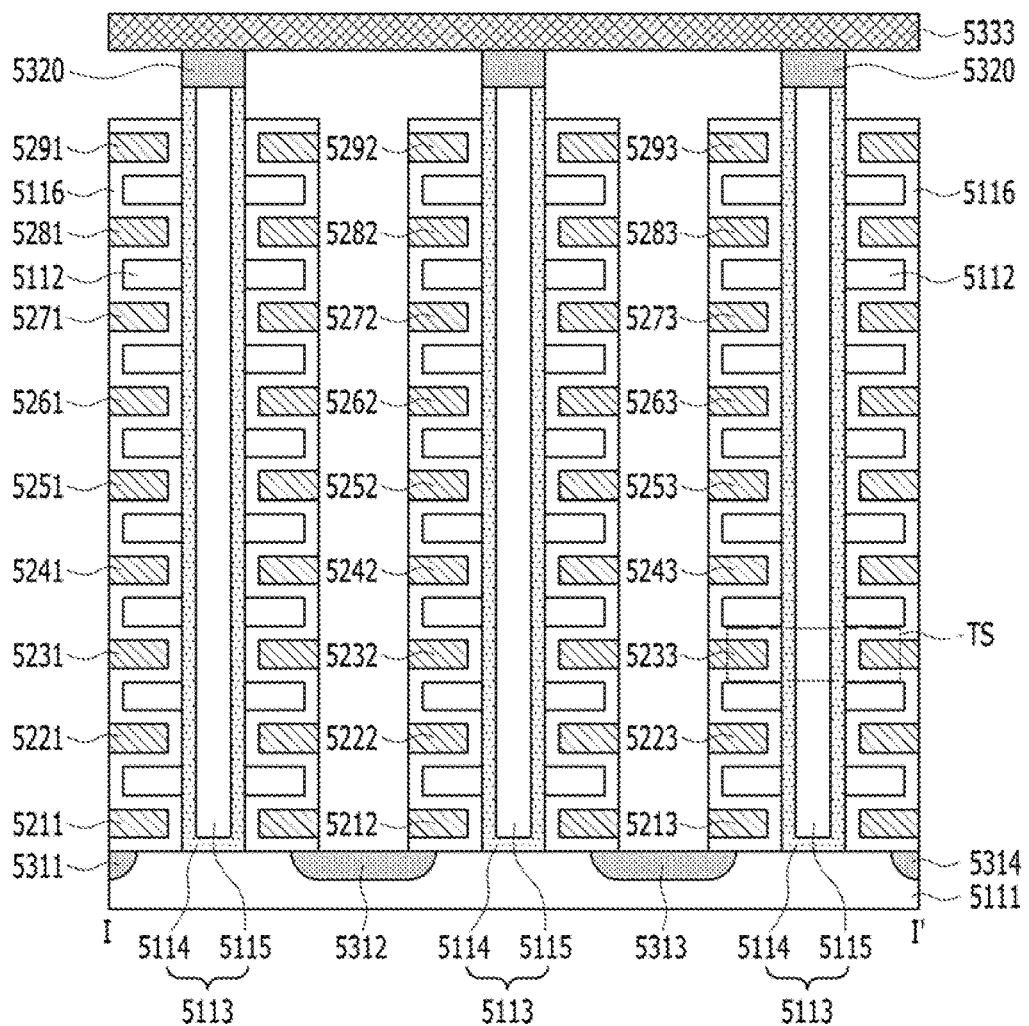

FIG. 5 is a perspective view of one block BLKi of the memory blocks BLK0 to BLKN–1 shown in FIG. 4. FIG. 6 is a cross-sectional view taken along a line I-I' of the memory block BLKi shown in FIG. 5.

Referring to FIGS. 5 and 6, a memory block BLKi may include a structure which extends in the first to third directions. A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While in the embodiment shown, the substrate 5111 may be p-type silicon, it is noted that the substrate 5111 is not limited to being p-type silicon.

A plurality of doping regions 5311 to 5314 extending in the first direction may be provided over the substrate 5111. The plurality of doping regions 5311 to 5314 may contain a second type of impurity different from the impurity used in the substrate 5111. The plurality of doping regions 5311 to 5314 may be doped with an n-type impurity. While it is assumed here that first to fourth doping regions 5311 to 5314 are n-type, it is noted that the first to fourth doping regions 5311 to 5314 are not limited to being n-type.

In the region over the substrate 5111 between the first and second doping regions 5311 and 5312, a plurality of dielectric materials 5112 extending in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled with a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than one half of the distance between the dielectric materials 5112. In other words, a region having a material other than the dielectric material 5112 and the dielectric layer 5116 may be disposed between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 may lie below the first dielectric material.

In the region between the first and second doping regions 5311 and 5312, conductive materials 5211 to 5291 may be provided over the exposed surface of the dielectric layer 5116. The conductive material 5211 extending in the first direction may be provided between the dielectric material 5112 adjacent to the substrate 5111 and the substrate 5111. In particular, the conductive material 5211 may be provided between (i) the dielectric layer 5116 disposed over the substrate 5111 and (ii) the dielectric layer 5116 disposed over the bottom surface of the dielectric material 5112 adjacent to the substrate 5111.

The conductive material extending in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 extending in the first direction may be provided between the dielectric materials 5112. The conductive material 5291 extending in the first direction may be provided over the uppermost dielectric material 5112. The conductive materials 5211 to 5291 extending in the first direction may be a metallic material. The conductive materials 5211 to 5291 extending in the first direction may be a conductive material such as polysilicon.

In the region between the second and third doping regions 5312 and 5313, the same structures may be provided as the structures provided between the first and second doping regions 5311 and 5312. For example, in the region between the second and third doping regions 5312 and 5313, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 extending in the first direction may be provided.

In the region between the third and fourth doping regions 5313 and 5314, the same structures may be provided as the structured provided between the first and second doping regions 5311 and 5312. For example, in the region between the third and fourth doping regions 5313 and 5314, the plurality of dielectric materials 5112 extending in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 extending in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is noted that the drains 5320 are not limited to being n-type silicon. The width of each drain 5320 may be larger than the width of each corresponding pillar 5113. Each drain 5320 may be provided in the shape of a pad over the top surface of each corresponding pillar 5113.

Conductive materials 5331 to 5333 extending in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 extending in the third direction may be electrically coupled with through contact plugs. The conductive materials 5331 to 5333 extending in the third direction may be a metallic material. The conductive materials 5331 to 5333 extending in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 extending in the first direction. The respective pillars 5113 may form NAND strings NS together with the dielectric layer 5116 and the conductive materials 5211 to 5291, 5212 to 5292 and 5213 to 5293 extending in the first direction. Each NAND string NS may include a plurality of transistor structures TS.

Figure 7:
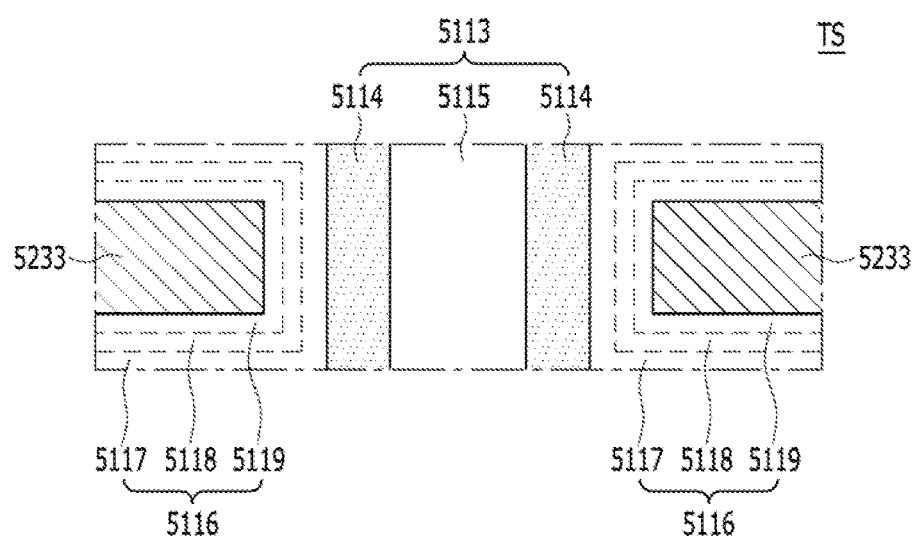

FIG. 7 is a cross-sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. In detail, the memory block BLKi may include the plurality of NAND strings NS extending in the second direction or a direction perpendicular to the substrate S111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293 extending in the first direction. In other words, the gates or the control gates may extend in the first direction and form word lines and at least two select lines, at least one source select line SSL and at least one ground select line GSL.

The conductive materials 5331 to 5333 extending in the third direction may be electrically coupled to one end of the NAND strings NS. The conductive materials 5331 to 5333 extending in the third direction may serve as bit lines BL. That is, in one memory block BLKi, the plurality of NAND strings NS may be electrically coupled to one bit line BL.

The second type doping regions 5311 to 5314 extending in the first direction may be provided to the other ends of the NAND strings NS. The second type doping regions 5311 to 5314 extending in the first direction may serve as common source lines CSL.

Namely, the memory block BLKi may include a plurality of NAND strings NS extending in a direction perpendicular to the substrate 5111, e.g., the second direction, and may serve as a NAND flash memory block, for example, of a charge capturing type memory, having a plurality of NAND strings NS are electrically coupled to one bit line BL.

While it is illustrated in FIGS. 5 to 7 that the conductive materials 5211 to 5291, 5212 to 5292 and 5213 to 5293 extending in the first direction are provided in 9 layers, it is noted that the conductive materials 5211 to 5291, 5212 to 5292 and 5213 to 5293 extending in the first direction are not limited to being provided in 9 layers. For example, conductive materials extending in the first direction may be provided in 8 layers, 16 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 extending in the first direction and the number of common source lines 5311 to 5314 may be controlled as well.

Further, while it is illustrated in FIGS. 5 to 7 that 3 NAND strings NS are electrically coupled to one conductive material which extends in the first direction, it is noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
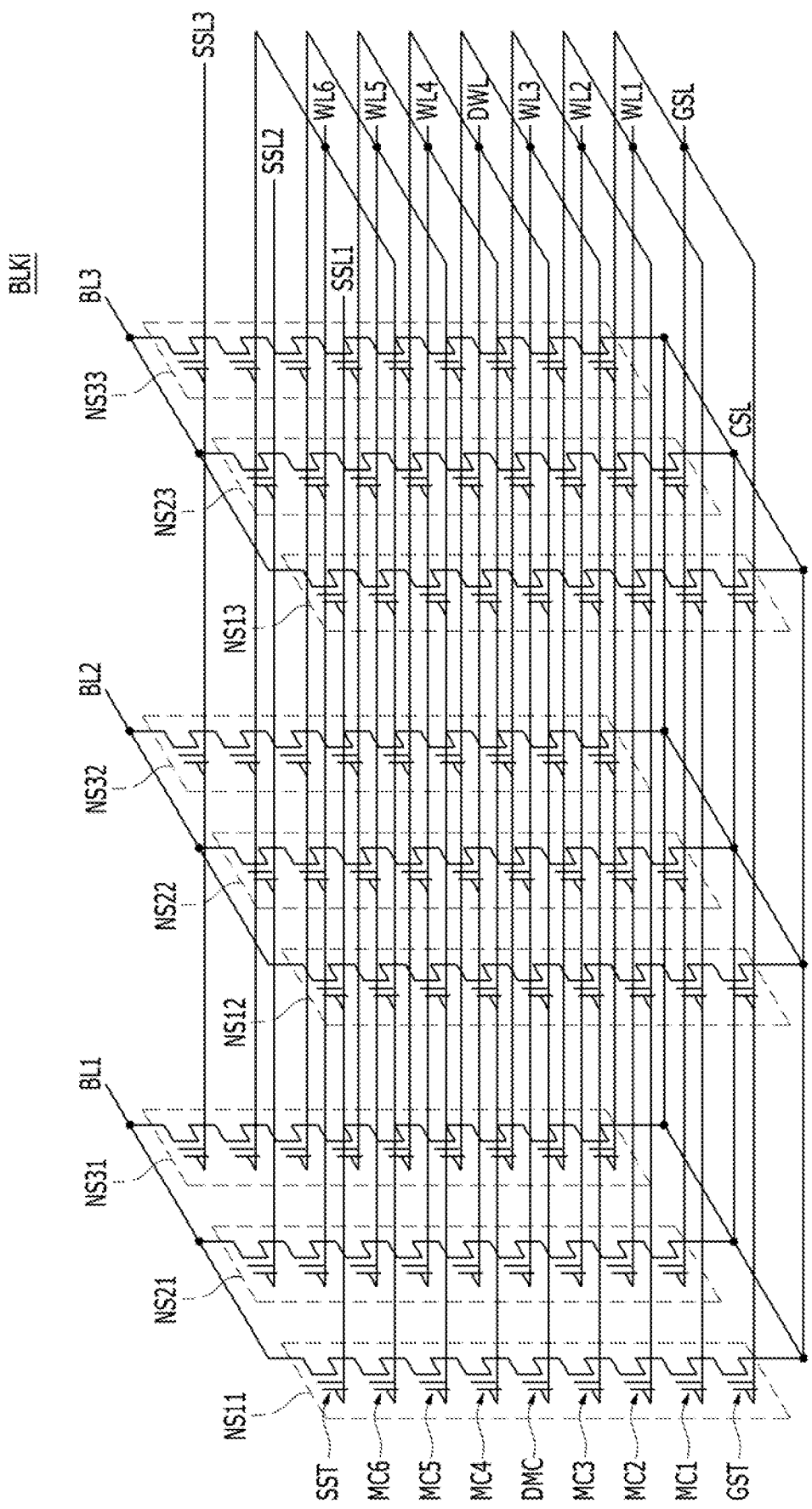

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 extending in the first direction may be provided. The conductive materials 5211 to 5291, 5212 to 5292 and 5213 to 5293 extending in the first direction may be electrically coupled in common to upper layers through contacts. At the upper layers, the conductive materials 5211 to 5291, 5212 to 5292 and 5213 to 5293 extending in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system according to an embodiment of the invention implemented with a three-dimensional (3D) nonvolatile memory device different from the first structure.

Figure 9:
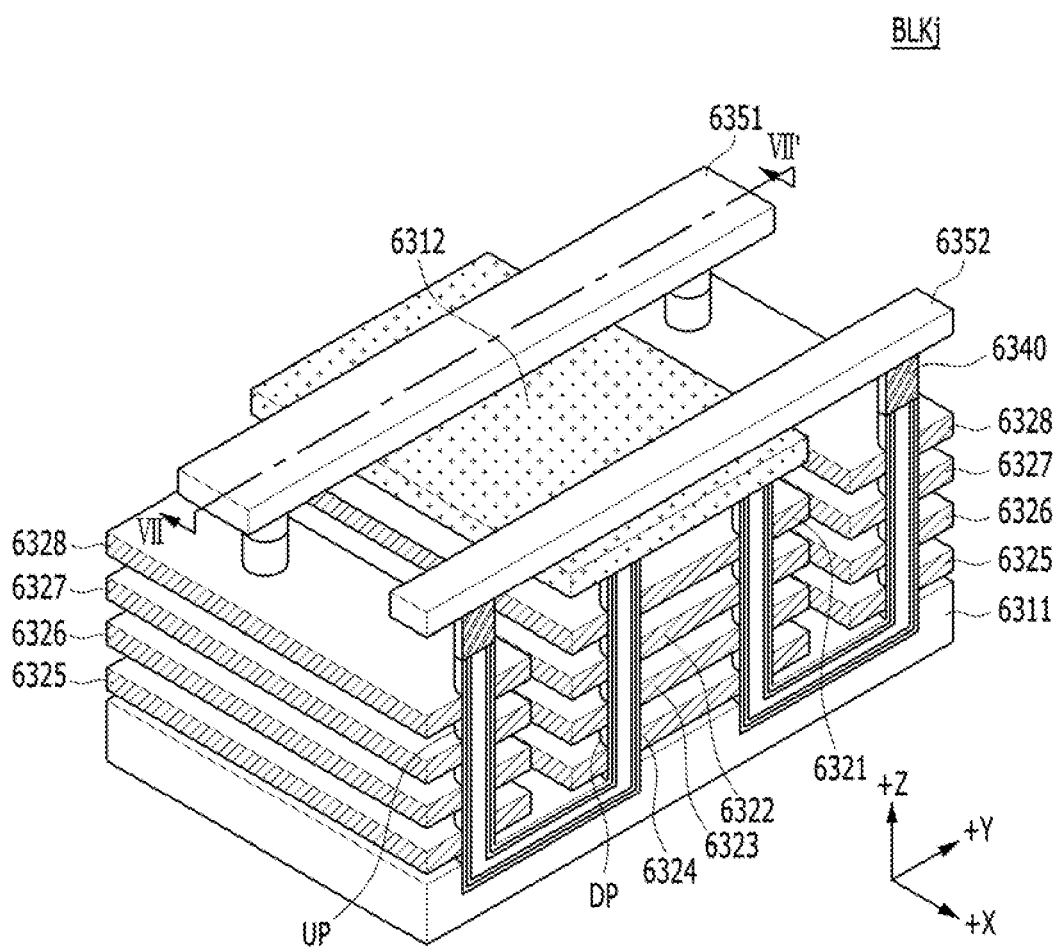

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4. FIG. 10 is a cross-sectional view illustrating the memory block BLKj taken along the line VII-VII' of FIG. 9.

Figure 10:
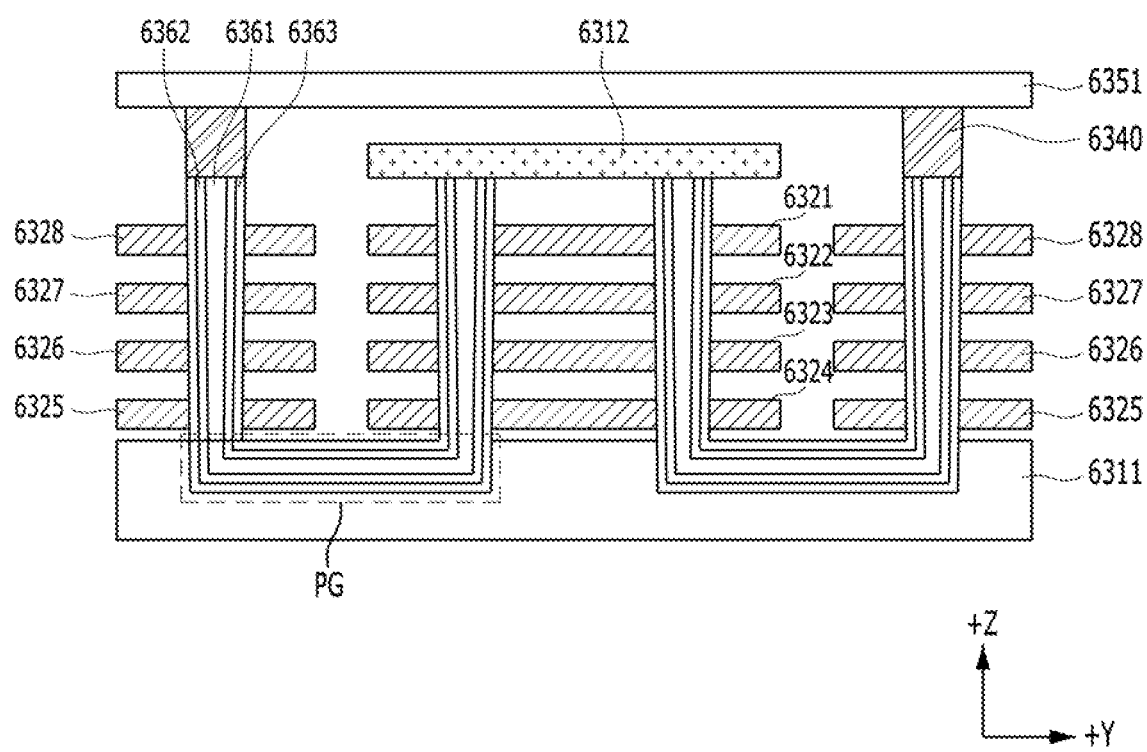

Referring to FIGS. 9 and 10, the memory block BLKj among the plurality of memory blocks of the memory device 150 of FIG. 1 may include structures extending in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is noted that the substrate 6311 is not limited to being p-type silicon.

First to fourth conductive materials 6321 to 6324 extending in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 extending in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 extending in the y-axis direction may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
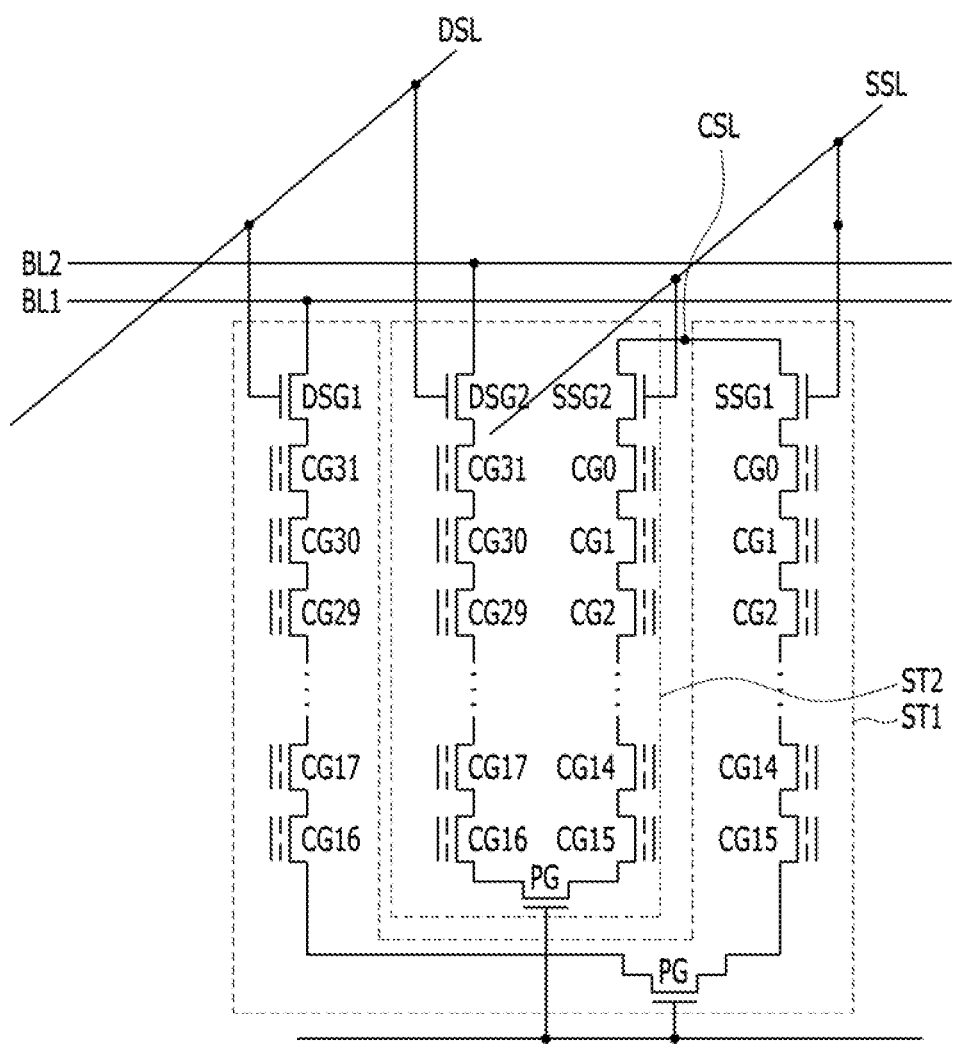

FIG. 11 is a circuit diagram illustrating the equivalent circuit of the memory block BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12A:
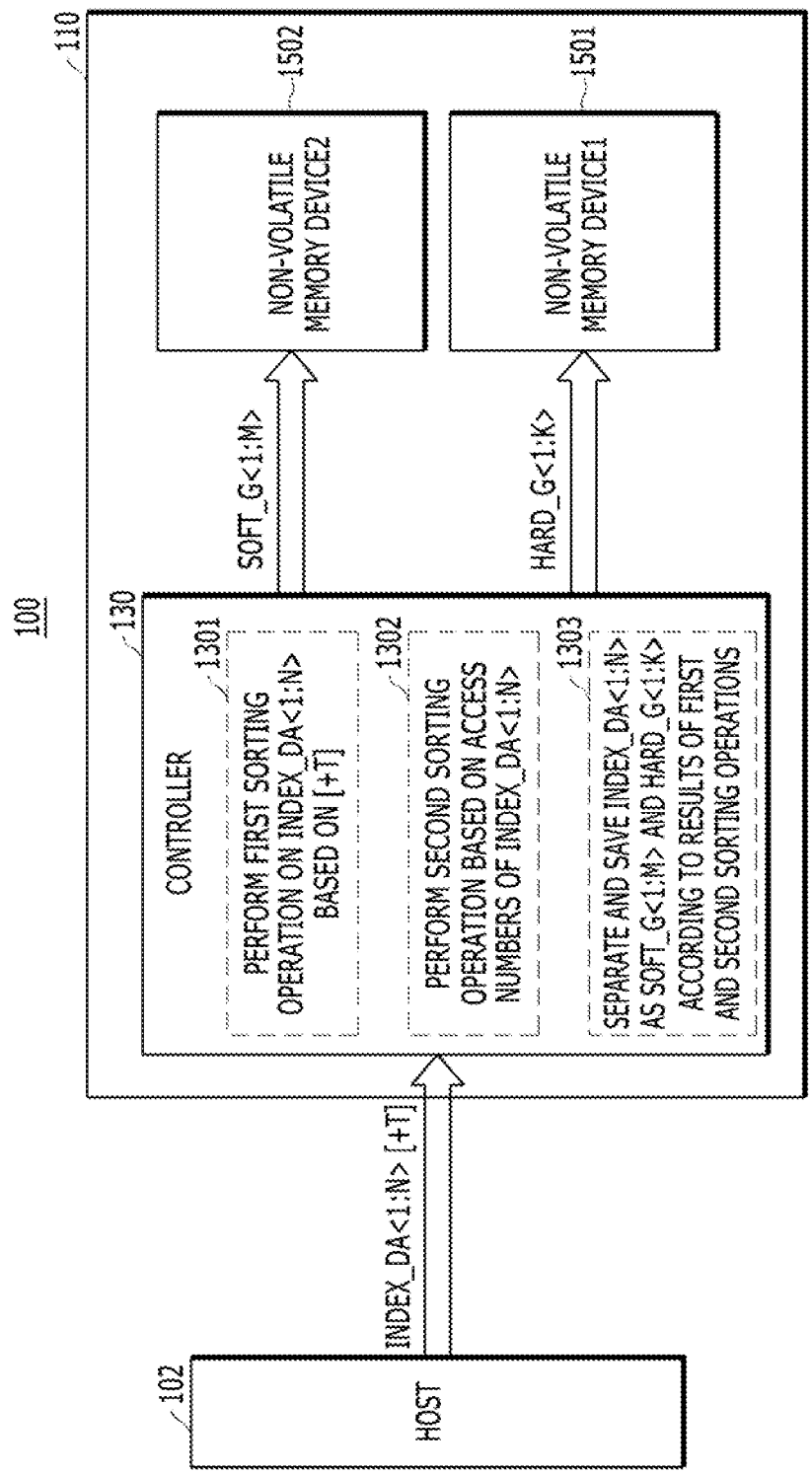
Figure 12C:
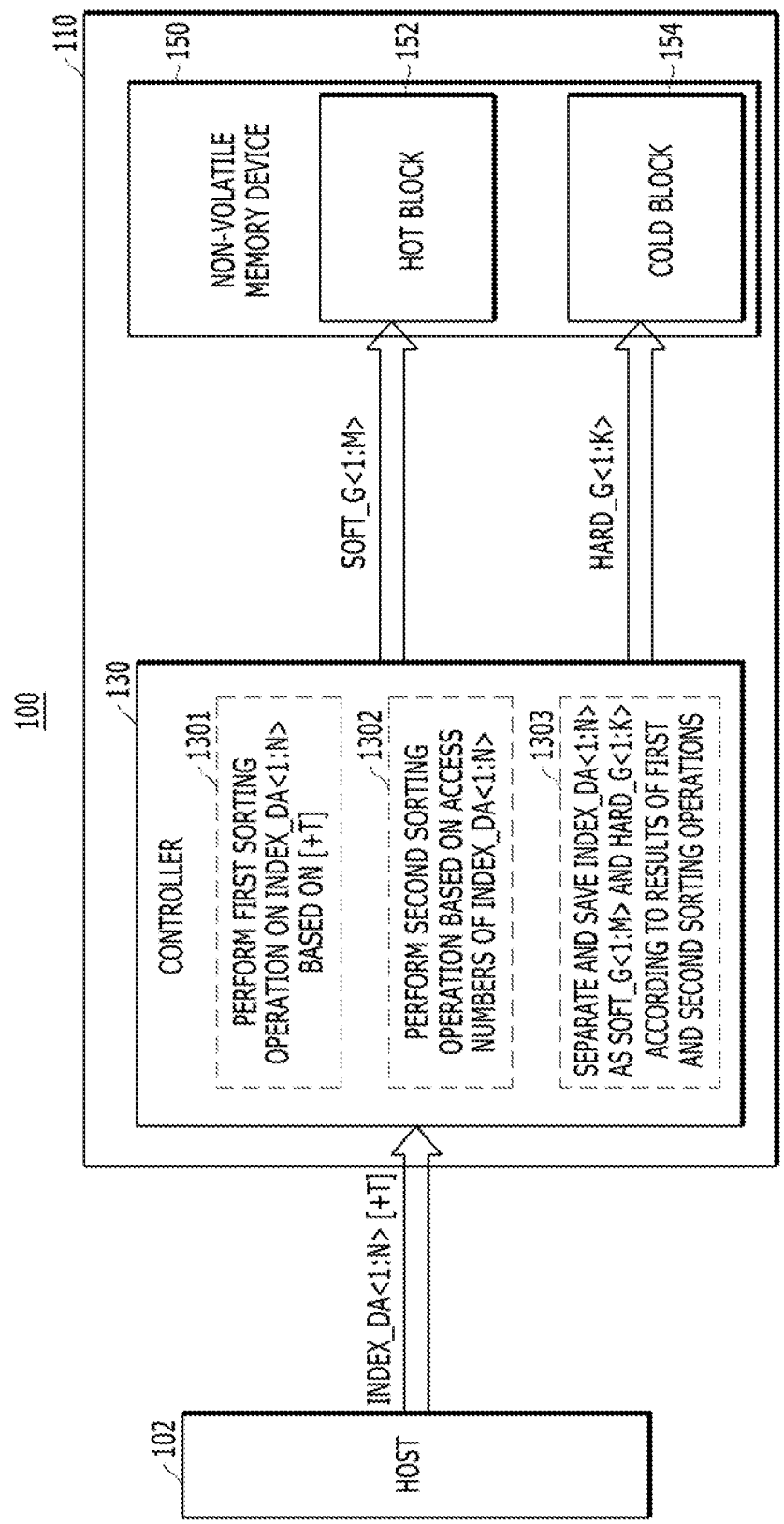

FIGS. 12A to 12C are block diagrams of a data processing system illustrating an operation of managing index data according to an embodiment of the invention. For example, the data processing system of FIGS. 12A to 12C may be the data processing system 100 of FIG. 1.

Referring now to FIGS. 12A to 12C, the data processing system 100 may include a host 102 and a memory system 110. The memory system 110 illustrated in FIG. 12A may include a controller 130 and non-volatile memory devices 1501 and 1502. The memory system 110 illustrated in FIG. 12B may include a controller 130, a volatile memory device 144, and a non-volatile memory device 150. The memory system 110 illustrated in FIG. 12C may include a controller 130 and a non-volatile memory device 150.

First, the operation of managing index data will be described as follows. The index data may be information required for accessing the contents of user data. For example, the host 102 may access user data having a relatively large size through index data having a relatively small size.

In this example, a host 102 may quickly access desired user data, by quickly finding index data corresponding to the user data. For example the host 102 may manage index data having a tree structure.

For example, the host 102 may manage a plurality of index data having a balanced tree (B-TREE) structure, allowing the host 102 to may access any index data among the plurality of index data at the same time. Thus, a B-TREE structure may be used for managing a plurality of index data.

Figure 13:
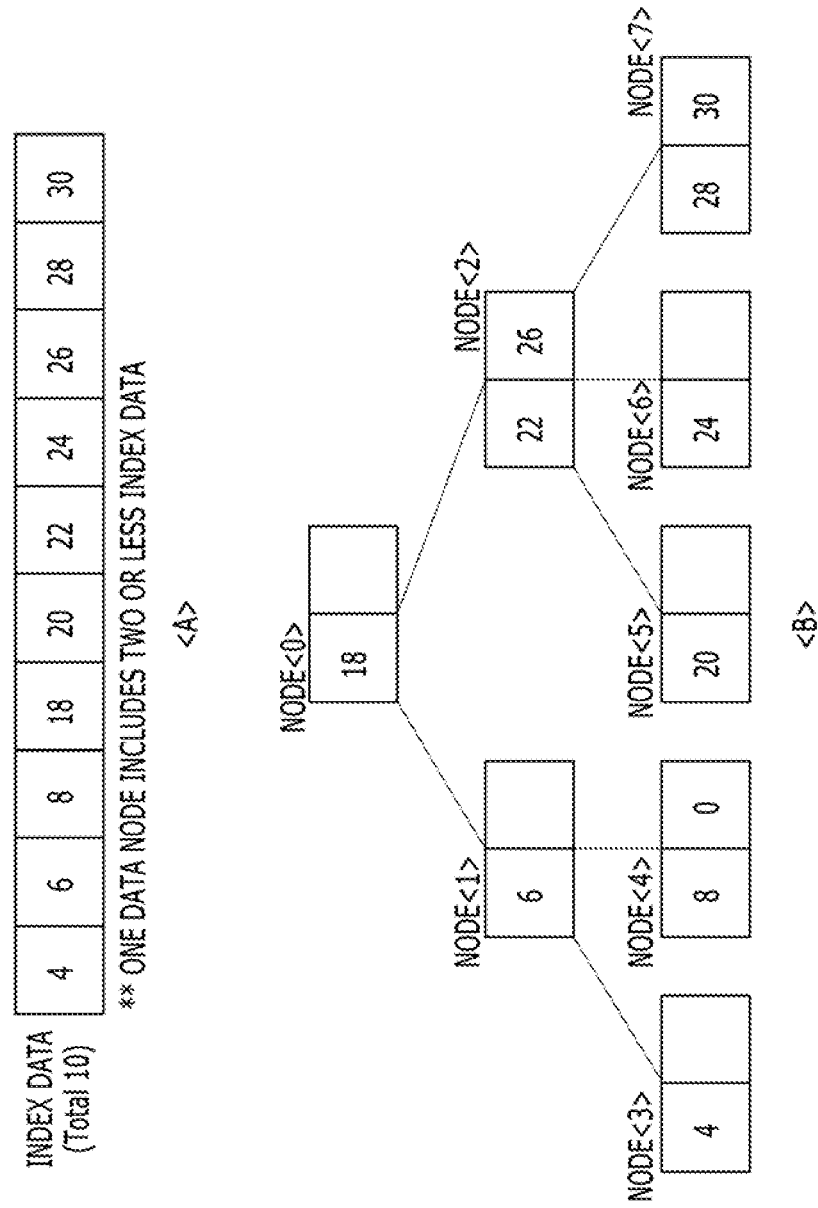
FIG. 13 is a diagram illustrating index data having a balanced tree structure, according to an embodiment of the invention.

FIG. 13 illustrates an example of a B-TREE structure for managing a plurality of index data in a data processing system 100 according to an embodiment of invention.

Referring to FIG. 13, a B-TREE structure may be defined as follows.

First, the B-TREE structure may first include a plurality of data nodes configured in a tree structure. Each data node may include one or more (up to H) index data, where H is an integer equal to or larger than two.

Second, each of the data nodes other than leaf nodes set to the deepest tree level may include child data nodes the number of which may range from H/2 to H+1. The value of index data included in a corresponding data node may correspond to a value obtained by dividing the values of index data included in two or more data nodes.

Third, the root node which is set to the shallowest tree level and has no parent data nodes may have two or more child data nodes.

Fourth, leaf nodes are nodes which are set to the deepest tree level and hence have no child trees. Hence, all leaf nodes may have the same tree level.

For example, in the B-TREE structure illustrated in FIG. 13, 10 index data may have values of 4, 6, 8, 18, 20, 22, 24, 26, 28, and 30, as indicated by the reference character <A>. Furthermore, in the example of FIG. 3, index H is 2 i.e. each data node may include two or less index data.

In this case, a total of eight data nodes NODE<0:7> may be generated as indicated by the reference character <B>. Specifically, the zeroth data node NODE<0> serving as the root node may include the index data having a value of 18. The first data node NODE<1> positioned in the left side of two child nodes NODE<1:2> having a tree level higher by one level than the zeroth data node NODE<0> may include the index data having a value of 6. The second data node NODE<2> positioned in the right side of the two child nodes NODE<1:2> having a tree level higher by one level than the zeroth data node NODE<0> may include the index data having values of 22 and 26. The third data node NODE<3> positioned in the left side of two child nodes having a tree level higher by one level than the first data node NODE<1> may include the index data having a value of 4. The fourth data node NODE<4> positioned in the right side between the two child nodes having a tree level higher by one level than the first data node NODE<1> may include the index data having a value of 8. The fifth data node NODE<5> positioned in the left side among three child nodes having a tree level higher by one level than the second data node NODE<2> may include the index data having a value of 20. The sixth data node NODE<6> positioned in the middle among the three child nodes having a tree level higher by one level than the second data node NODE<2> may include the index data having a value of 24. The seventh data node NODE<7> positioned in the right side among the three child nodes having a tree level higher by one level than the second data node NODE<2> may include the index data having values of 28 and 30.

FIG. 12A illustrates that a data processing system 100 according to an embodiment of the invention may separate and save a plurality of index data INDEX_DA<1:N>[+T] into the plurality of non-volatile memory devices 1501 and 1502. The plurality of index data INDEX_DA<1:N>[+T] may be managed in a tree structure by the host 102. For example, the host 102 may arrange the index data in a tree structure.

Referring to FIG. 12A, specifically, each of the index data INDEX_DA<1:N> arranged in a tree structure by the host 102 may include tree information [+T] indicating the tree level thereof.

The memory system 110 may perform a first sorting operation 1301 by sorting the plurality of index data INDEX_DA<1:N> applied from the host 102 based on the tree levels of the tree information [+T] included in the respective index data INDEX_DA<1:N>. Furthermore, the memory system 110 may perform a second sorting operation 1302 by sorting the plurality of index data INDEX_DA<1:N> applied from the host 102 based on the numbers of accesses to the respective index data INDEX_DA<1:N>. Furthermore, the memory system 110 may perform a separating and saving operation 1303 by separating and saving the plurality of index data INDEX_DA<1:N>, which is sorted into a plurality of groups HARD_G<1:K> and SOFT_G<1:M> and through the first and second sorting operations 1301 and 1302, into two non-volatile memory devices 1501 and 1502 which are different storage regions.

In this example, the memory system 110 may include the controller 130 and the first and second non-volatile memory devices 1501 and 1502. The first and second non-volatile memory devices 1501 and 1502 may be configured to have different operating speeds. For example, the first non-volatile memory device 1501 may be operated according to a multi-level cell (MLC) scheme, and the second non-volatile memory device 1502 may be operated according to a single level cell (SLC) scheme, such that the second non-volatile memory device 1502 is set to have higher operating speed than the first non-volatile memory device 1501.

Thus, the controller 130 may sort the plurality of index data INDEX_DA<1:N> into a plurality of groups HARD_G<1:K> and SOFT_G<1:M> through the first and second sorting operations 1301 and 1302, and separate and save the plurality of groups HARD_G<1:K> and SOFT_G<1:M> into the first and second non-volatile memory devices 1501 and 1502 through the separating and saving operation 1303.

For example, as illustrated in FIG. 12A, the memory system 110 may sort the N index data INDEX_DA<1:N> into two groups SOFT_G<1:M> and HARD_G<1:K> through the first and second sorting operations 1301 and 1302, save K data included in the first group HARD_G<1:K> into the first non-volatile memory device 1501, and store M data included in the second group SOFT_G<1:M> into the second non-volatile memory device 1502.

FIG. 12B illustrates that the data processing system 100 may separate and save the plurality of index data INDEX_DA<1:N> managed in a tree structure by the host 102 into the non-volatile memory device 150 and the volatile memory device 144. Specifically, each of the index data INDEX_DA<1:N> may be managed in a tree structure by the host 102 and may include tree information [+T] indicating the tree level thereof.

The memory system 110 may perform a first sorting operation 1301 by sorting the plurality of index data INDEX_DA<1:N> applied from the host 102 based on the tree levels of the tree information [+T] included in the respective index data INDEX_DA<1:N>. Furthermore, the memory system 110 may perform a second sorting operation 1302 by sorting the plurality of index data INDEX_DA<1:N> applied from the host 102 based on the numbers of accesses to the respective index data INDEX_DA<1:N>. Furthermore, the memory system 110 may perform a separating and saving operation 1303 by separating and saving the plurality of index data INDEX_DA<1:N>, which is sorted into a plurality of groups L_SOFT_G<1:L>, P_SOFT_G<1:P>, and HARD_G<1:K> through the first and second sorting operations 1301 and 1302, into the non-volatile memory device 150 and the volatile memory device 144 which are different storage regions.

In the example of FIG. 12B, the memory system 110 may include the controller 130, the non-volatile memory device 150, and the volatile memory device 144. The non-volatile memory device 150 may include first and second regions 152 and 154 which are different storage regions. The first and second regions 152 and 154 of the non-volatile memory device 150 may be set to have different operating speeds. For example, the first region 152 may be operated according to the SLC scheme and the second region 154 may be operated according to the MCL scheme, such that the first region 152 is set to have a higher operating speed than the second region 154.

Thus, the controller 130 may sort the plurality of index data INDEX_DA<1:N> into the plurality of groups L_SOFT_G<1:L>, P_SOFT_G<1:P>, and HARD_G<1:K> through the first and second sorting operations 1301 and 1302, and separate and save the plurality of index data INDEX_DA<1:N> into the volatile memory device 144 and the first and second regions 152 and 154 of the non-volatile memory device 150 through the separating and saving operation 1303.

For example, as illustrated in FIG. 12B, the memory system 110 may sort the N index data INDEX_DA<1:N> into three groups L_SOFT_G<1:L>, P_SOFT_G<1:P>, and HARD_G<1:K> through the first and second sorting operations 1301 and 1302. Then, the memory system 110 may save K data included in the first group HARD_G<1:K> into the second region 154 of the non-volatile memory device 150, save P data included in the second group P_SOFT_G<1:P> into the first region 152 of the non-volatile memory device 150, and save L data included in the third group L_SOFT_G<1:L> into the volatile memory device 144.

FIG. 12C illustrates that the data processing system 100 may separate and save the plurality of index data INDEX_DA<1:N>[+T] managed in a tree structure by the host 102 into different regions of the non-volatile memory device 150.

Referring to FIG. 12C, specifically, each of the index data INDEX_DA<1:N> managed in a tree structure by the host 102 may include tree information [+T] indicating the tree level thereof.

The memory system 110 may perform a first sorting operation 1301 by sorting the plurality of index data INDEX_DA<1:N> applied from the host 102 based on the tree levels of the tree information [+T] included in the respective index data INDEX_DA<1:N>. Furthermore, the memory system 110 may perform a second sorting operation 1302 by sorting the plurality of index data INDEX_DA<1:N> applied from the host 102 based on the numbers of accesses to the respective index data INDEX_DA<1:N>. Furthermore, the memory system 110 may perform a separating and saving operation 1303 by separating and saving the plurality of index data INDEX_DA<1:N>, which is sorted into a plurality of groups SOFT_G<1:M> and HARD_G<1:K> through the first and second sorting operations 1301 and 1302, into the plurality of blocks 152 and 154 of the non-volatile memory device 150.

In the example of FIG. 12C, the memory system 110 may include the controller 130 and the non-volatile memory device 150. The non-volatile memory device 150 may include a hot block 152 and a cold block 154.

Thus, the controller 130 may sort the plurality of index data INDEX_DA<1:N> into two groups SOFT_G<1:M> and HARD_G<1:K> through the first and second sorting operations 1301 and 1302, and separate and save the sorted index data INDEX_DA<1:N> into the hot block 152 and the cold block 154 of the non-volatile memory device 150 through the separating and saving operation 1303.

For example, as illustrated in FIG. 12C, the memory system 110 may sort the N index data INDEX_DA<1:N> into two groups SOFT_G<1:M> and HARD_G<1:K> through the first and second sorting operations 1301 and 1302. Then, the memory system 110 may save M data included in the first group SOFT_G<1:M> into the hot block 152 of the non-volatile memory device 150, and save K data included in the second group HARD_G<1:K> into the cold block 154 of the non-volatile memory device 150.

FIG. 14A to FIG. 14F are diagrams for illustrating first and second sorting operations, according to an embodiment of the invention of the present invention. For example, the first and second sorting operations of FIG. 14A to FIG. 14F may be performed by the data processing system 100 illustrated in FIG. 12A to FIG. 12C.

FIG. 14A illustrates the first sorting operation 1301 which is used to manage index data in the data processing system 100 illustrated in FIG. 12A to FIG. 12C.

The first sorting operation 1301 may include checking the tree information [+T] contained in the plurality of index data INDEX_DA<1:N> applied from the host 102, and sorting the plurality of index data INDEX_DA<1:N> into a leaf group formed by grouping data having the deepest tree level, a parent group formed by grouping data connected to the data included in the leaf group through the parent-child relationship, and a rest group formed by grouping the rest data excluding the data included in the leaf group and the parent group.

In this example, it is assumed that the host 102 manages the plurality of index data INDEX_DA<1:N> as seven data node NODE<0:6> through the tree structure illustrated in FIG. 14A. Furthermore, it is assumed that each of the data nodes NODE<0:6> includes three or less index data.

Specifically, the tree structure illustrated in FIG. 14A will be described as follows.

Referring to FIG. 14A, first, the third to sixth data nodes NODE<3:6> may be set to the deepest tree level LEVEL2, and have no child data nodes. Thus, index data included in the third to sixth data nodes NODE<3:6> may be sorted into the leaf group.

The first and second data nodes NODE<1:2> may be set to the tree level LEVEL1 which is lower by one level than the third to sixth data nodes NODE<3:6>, and serve as the parent nodes of the third to sixth data nodes NODE<3:6>. Thus, index data included in the first and second data nodes NODE<1:2> may be sorted into the parent group.

The zeroth data node NODE<0> may be set to the tree level LEVEL0 which is lower by one level than the first and second data nodes NODE<1:2> and serve as the root node having the shallowest tree level. Thus, the zeroth data node NODE<0> may not be included in the leaf group and the parent group, but sorted into the rest group.

In this way, the seven data nodes NODE<0:6> may be sorted into the leaf group, the parent group, and the rest group through the first sorting operation 1301.

Each of the index data INDEX_DA<1:N> managed as the seven data nodes NODE<0:6> may include tree information [+T] indicating the tree level thereof.

For example, since index data having tree information [+T] set to the tree level LEVEL0 are included in the zeroth data node NODE<0>, the index data may be sorted into the rest group through the first sorting operation 1301.

Similarly, since index data having tree information [+T] set to the tree level LEVEL1 are included in the first or second data node NODE<1 or 2>, the index data may be sorted into the parent group through the first sorting operation 1301.

Furthermore, since index data having tree information [+T] set to the tree level LEVEL2 are included in the third, fourth, fifth, or sixth data node NODE<3, 4, 5, or 6>, the index data may be sorted into the leaf group through the first sorting operation 1301.

FIG. 14B to FIG. 14F illustrate a second sorting operation 1302 for managing the index data in the data processing system 100 illustrated in FIG. 12A to FIG. 12C.

The second sorting operation 1302 may include checking the number of accesses to each of the plurality of index data INDEX_DA<1:N>, and sorting the plurality of index data INDEX_DA<1:N> into a soft group SOFT GROUP formed by grouping data accessed a larger number of times than a preset number and a hard group HARD GROUP formed by grouping data accessed a smaller number of times than the preset number.

Figure 14B:
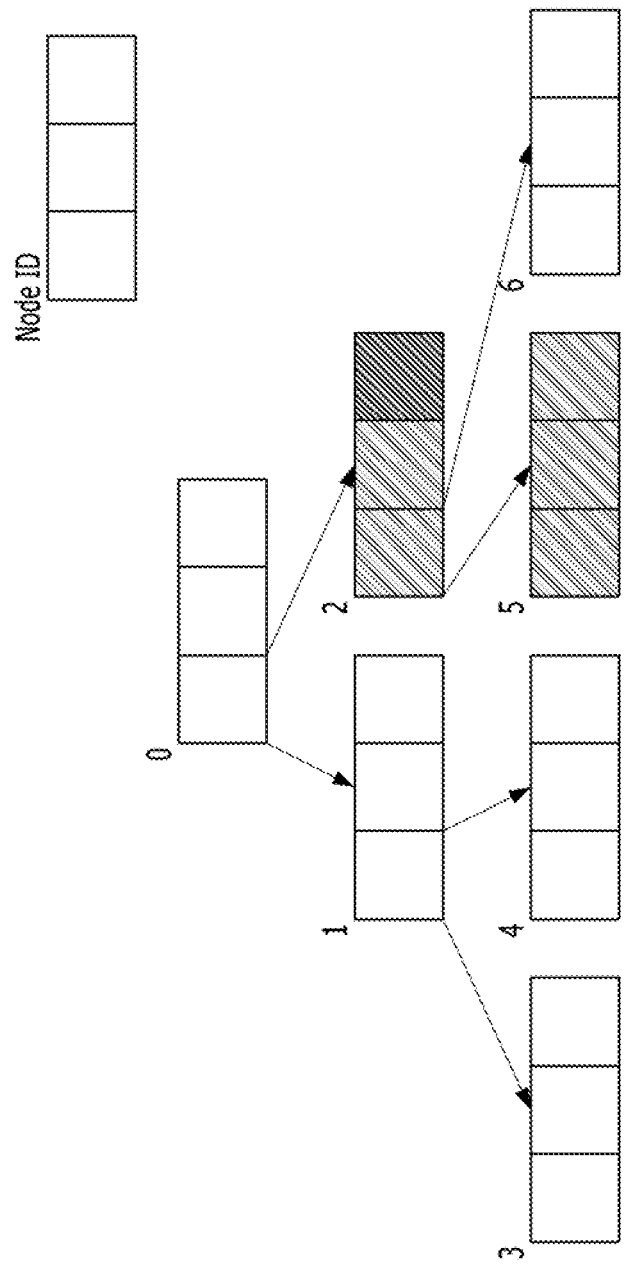

FIG. 14B illustrates that the host 102 may manage the plurality of index data INDEX_DA<1:N> as seven data nodes NODE<0:6> in a tree structure. In this example, it is assumed that each of the data nodes NODE<0:6> includes three or less index data.

Specifically, each of the second data node NODE<2> and the fifth data node NODE<5> in the tree structure illustrated in FIG. 14B may be a data node including index data accessed a larger number of times than a preset number. Thus, through the second sorting operation 1302, the second data node NODE<2> and the fifth data node NODE<5> may be sorted into the soft group.

In the tree structure illustrated in FIG. 14B, each of the zeroth data node NODE<0>, the first data node NODE<1>, the third data node NODE<3>, the fourth data node NODE<4>, and the sixth data node NODE<6> is a node which does not include index data accessed a larger number of times than the preset number. Thus, through the second sorting operation 1302, the zeroth data node NODE<0>, the first data node NODE<1>, the third data node NODE<3>, the fourth data node NODE<4>, and the sixth data node NODE<6> may be sorted into the hard group.

Referring to FIGS. 14A and 14B, the zeroth data node NODE<0> may be included in the rest group through the first sorting operation 1301, and included in the hard group through the second sorting operation 1302.

The first data node NODE<1> may be included in the parent group through the first sorting operation 1301, and included in the hard group through the second sorting operation 1302.

The second data node NODE<2> may be included in the parent group through the first sorting operation 1301, and included in the soft group through the second sorting operation 1302.

The third data node NODE<3>, the fourth data node NODE<4>, and the sixth data node NODE<6> may be included in the leaf group through the first sorting operation 1301, and included in the hard group through the second sorting operation 1302.

The fifth data node NODE<5> may be included in the leaf group through the first sorting operation 1301, and included in the soft group through the second sorting operation 1302.

Through the first and second sorting operations 1301 and 1302, the memory system 110 may recognize the group to which each of the seven data nodes NODE<0:6> including the plurality of index data INDEX_DA<1:N> belongs.

In this example, the separating and saving operation 1303 of the memory system 110 having the configuration illustrated in FIG. 12A may include saving index data HARD_G<1:K> included in the hard group into the first non-volatile memory device 1501 and saving index data SOFT_G<1:M> included in the soft group into the second non-volatile memory device 1502.

For example, the index data HARD_G<1:K> included in each of the zeroth data node NODE<0>, the first data node NODE<1>, the third data node NODE<3>, the fourth data node NODE<4>, and the sixth data node NODE<6>, which are included in the hard group in FIG. 14B, may be saved into the first non-volatile memory device 1501. Furthermore, the index data SOFT_G<1:M> included in each of the second data node NODE<2> and the fifth data node NODE<5>, which are included in the soft group SOFT GROUP, may be saved into the second non-volatile memory device 1502.

The separating and saving operation 1303 of the memory system 110 having the configuration illustrated in FIG. 12B may include saving the index data L_SOFT_G<1:L> included in both of the leaf group and the soft group into the volatile memory device 144, saving the index data P_SOFT_G<1:P> included in both of the parent group and the soft group into the first region 152 of the non-volatile memory device 150, and saving the index data HARD_G<1:K> included in the hard group into the second region 154 of the non-volatile memory device 150.

For example, the index data L_SOFT_G<1:L> included in the fifth data node NODE<5> which is sorted into the leaf group in FIG. 14A and sorted into the soft group in FIG. 14B may be saved into the volatile memory device 144. The index data P_SOFT_G<1:P> included in the second data node NODE<2> which is sorted into the parent group in FIG. 14A and sorted into the soft group in FIG. 14B may be saved into the first region 152 of the non-volatile memory device 150. The index data HARD_G<1:K> included in each of the zeroth data node NODE<0>, the first data node NODE<1>, the third data node NODE<3>, the fourth data node NODE<4>, and the sixth data node NODE<6>, which are sorted into the hard group in FIG. 14B, may be saved into the second region 154 of the non-volatile memory device 150.

The separating and saving operation 1303 of the memory system 110 having the configuration illustrated in FIG. 12C may include saving the index data HARD_G<1:K> included in the hard group into the cold block 154 of the non-volatile memory device 150 and saving the index data SOFT_G<1:M> included in the soft group into the hot block 152 of the non-volatile memory device 150.

For example, the index data HARD_G<1:K> Included in each of the zeroth data node NODE<0>, the first data node NODE<1>, the third data node NODE<3>, the fourth data node NODE<4>, and the sixth data node NODE<6>, which are included in the hard group in FIG. 14B, may be saved into the cold block 154 of the non-volatile memory device 150. Furthermore, the index data SOFT_G<1:M> included in each of the second data node NODE<2> and the fifth data node NODE<5>, which are included in the soft group, may be saved into the hot block 152 of the non-volatile memory device 150.

FIG. 14C to FIG. 14F illustrate the second sorting operation 1302 of sorting new data when the new data exist in the plurality of index data INDEX_DA<1:N> applied from the host 102.

Specifically, the second sorting operation 1302 of sorting new data among the plurality of index data INDEX_DA<1:N> may include sorting the new data into the soft group when any one of data adjacent to the new data is included in the soft group, regardless of the number of accesses to the new data. That is, when the data adjacent to the new data are included in both of the soft group and the hard group as well as when all of the data adjacent to the new data are included in the soft group, the new data may be included in the soft group. On the other hand, when all of the data adjacent to the new data are included in the hard group, the new data may be included in the hard group.

In this example, data adjacent to the new data may include data of the leaf group which has a value within a preset range from the value of the new data. Furthermore, data adjacent to the new data may include data of the parent group which is connected to the new data through the parent-child relationship. Furthermore, the data adjacent to the new data may include data of the leaf group which is connected to the data of the parent group through the parent-child relationship, the data of the parent group being connected to the new data through the parent-child relationship.

A reason for determining a group including new data as the soft group only by checking the adjacency of the new data is because data adjacent to data included in the soft group are highly likely to be accessed while the data included in the soft group are accessed.

For reference, due to the characteristics of the above-described B-TREE structure, the new data may become data of the leaf group at all times.

FIG. 14C illustrates that the seven data nodes NODE<0:6> described with reference to FIG. 14B may have a tree structure and a seventh data node NODE<7> Including new data is further included. In this example, it is assumed that the new data has an intermediate value between the value of index data included in the fifth data node NODE<5> and the value of index data included in the sixth data node NODE<6>. Thus, the seventh data node NODE<7> may be positioned between the fifth data node NODE<5> and the sixth data node NODE<6> and have a child-parent relationship with the second data node NODE<2>.

FIG. 14B illustrates a state in which the second data node NODE<2> and the fifth data node NODE<5> are included in the soft group, while the zeroth data node NODE<0>, the first data node NODE<1>, the third data node NODE<3>, the fourth data node NODE<4>, and the sixth data node NODE<6> are included in the hard group. However, FIG. 14C illustrates a state in which only the fifth data node NODE<5> is included in the soft group and the zeroth data node NODE<0>, the first data node NODE<1>, the second data node NODE<2>, the third data node NODE<3>, the fourth data node NODE<4>, and the sixth data node NODE<6> are included in the hard group.

In this state, since the fifth data node NODE<5> adjacent to the seventh data node NODE<7> including the new data may be included in the soft group, the seventh data node NODE<7> may also be included in the soft group.

That is, since the fifth data node NODE<5>, the sixth data node NODE<6> and the seventh data node NODE<7> have the child-parent relationship with the second data node NODE<2>, the data of the fifth data node NODE<5>, the sixth data node NODE<6>, and the seventh data node NODE<7> may be considered as data adjacent to each other. In this example, since the sixth data node NODE<6> may be included in the hard group but the fifth data node NODE<5> may be included in the soft group, the seventh data node NODE<7> may be included in the soft group. If even the fifth data node NODE<5> were included in the hard group, the seventh data node NODE<7> would be included in the hard group.

For reference, although the seventh data node NODE<7> is initially included in the soft group, the seventh data node NODE<7> may not be continuously included in the soft group, but changed to the hard group during the second sorting operation 1302 which is repeated afterwards.

FIG. 14D illustrates that the seven data nodes NODE<0:6> described with reference to FIG. 14B have a tree structure and a seventh data node NODE<7> including new data is further included. In this example, it is assumed that the new data has an intermediate value between the value of index data included in the fifth data node NODE<S> and the value of index data included in the sixth data node NODE<6>. Thus, the seventh data node NODE<7> may be positioned between the fifth data node NODE<5> and the sixth data node NODE<6> and have the child-parent relationship with the second data node NODE<2>.

FIG. 14B illustrates a state having the second data node NODE<2> and the fifth data node NODE<5> are included in the soft group, while the zeroth data node NODE<0>, the first data node NODE<1>, the third data node NODE<3>, the fourth data node NODE<4>, and the sixth data node NODE<6> are included in the hard group. However, FIG. 14D illustrates a state having only the second data node NODE<2> is included in the soft group and the zeroth data node NODE<0>, the first data node NODE<1>, the third data node NODE<3>, the fourth data node NODE<4>, the fifth data node NODE<5>, and the sixth data node NODE<6> are included in the hard group.

In this state, since the second data node NODE<2> adjacent to the seventh data node NODE<7> including the new data is included in the soft group, the seventh data node NODE<7> may also be included in the soft group.

That is, since the second data node NODE<2> has the parent-child relationship with the seventh data node NODE<7>, the data of the second data node NODE<2> and the seventh data node NODE<7> may be considered as data adjacent to each other. Thus, although the fifth data node NODE<5> are the sixth data node NODE<6> are included in the hard group, the seventh data node NODE<7> may be included in the soft group. If even the second data node NODE<2> were included in the hard group, the seventh data node NODE<7> would be included in the hard group.

For reference, although the seventh data node NODE<7> is initially included in the soft group SOFT GROUP, the seventh data node NODE<7> may not be continuously included in the soft group SOFT GROUP, but changed to the hard group HARD GROUP during the second sorting operation 1302 which is repeated afterwards.

FIG. 14E illustrates that the seven data nodes NODE<0:6> described with reference to FIG. 14B have a tree structure and a seventh data node NODE<7> including new data is further included. In this example, it is assumed that the new data has an intermediate value between the value of index data included in the fifth data node NODE<5> and the value of index data included in the sixth data node NODE<6>. Thus, the seventh data node NODE<7> may be positioned between the fifth data node NODE<5> and the sixth data node NODE<6> and have the child-parent relationship with the second data node NODE<2>.

FIG. 14B illustrates a state having the second data node NODE<2> and the fifth data node NODE<5> are included in the soft group, while the zeroth data node NODE<0>, the first data node NODE<1>, the third data node NODE<3>, the fourth data node NODE<4>, and the sixth data node NODE<6> are included in the hard group. However, FIG. 14E illustrates a state having only the fifth data node NODE<5> is included in the soft group and the zeroth data node NODE<0>, the first data node NODE<1>, the second data node NODE<2>, the third data node NODE<3>, the fourth data node NODE<4>, and the sixth data node NODE<6> are included in the hard group.

In this state, since the fifth data node NODE<5> adjacent to the seventh data node NODE<7> including the new data is included in the soft group, the seventh data node NODE<7> may also be included in the soft group.

That is, the fifth data node NODE<5>, the sixth data node NODE<6>, and the seventh data node NODE<7> may have values adjacent to each other within a preset range. In this example, since the sixth data node NODE<6> is included in the hard group but the fifth data node NODE<5> is included in the soft group, the seventh data node NODE<7> may be included in the soft group. For example, if the fifth data node NODE<5> were included in the hard group, the seventh data node NODE<7> would have been included in the hard group.

For reference, although the seventh data node NODE<7> is initially included in the soft group, the seventh data node NODE<7> may not be continuously included in the soft group, but changed to the hard group during the second sorting operation 1302 which is repeated afterwards.

Figure 14F:
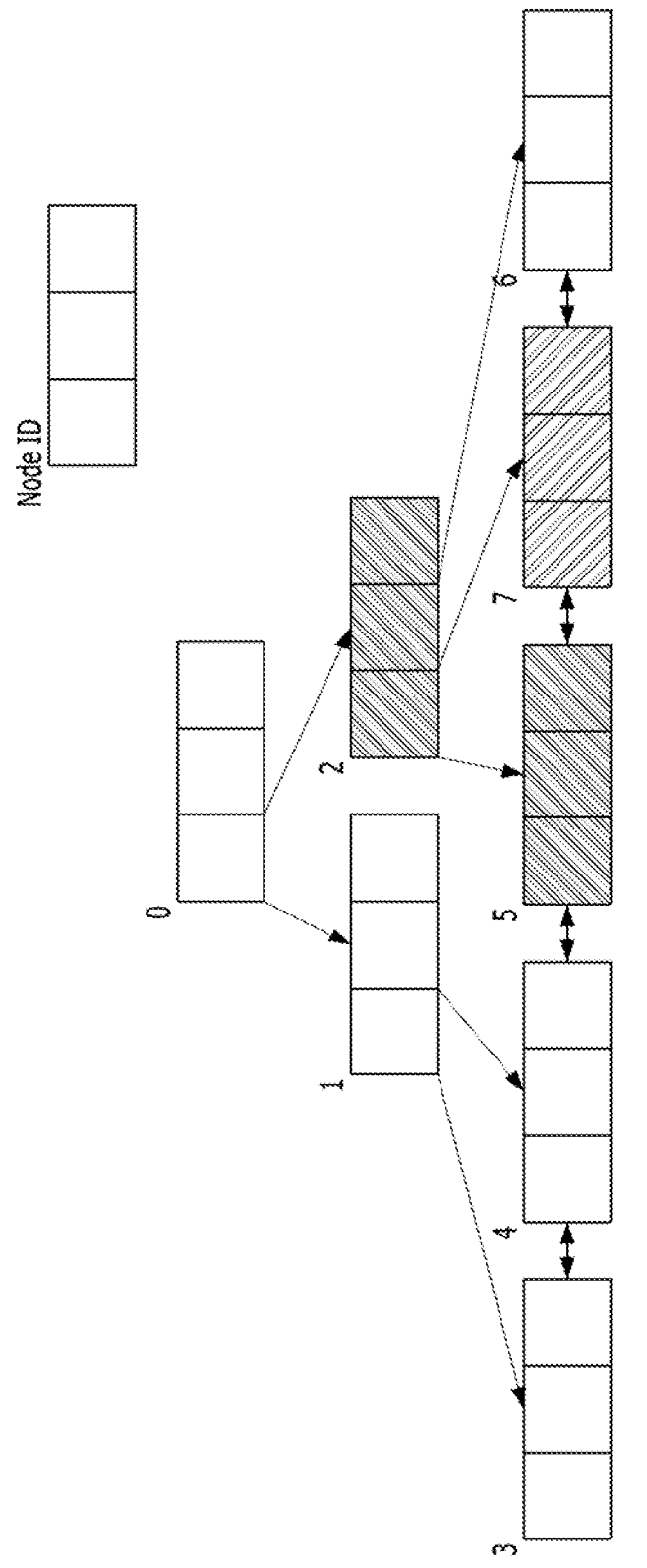

FIG. 14F illustrates that the seven data nodes NODE<0:6> described with reference to FIG. 14B have a tree structure and a seventh data node NODE<7> Including new data is further included. In this example, it is assumed that the new data has an intermediate value between the value of index data included in the fifth data node NODE<5> and the value of index data included in the sixth data node NODE<6>. Thus, the seventh data node NODE<7> may be positioned between the fifth data node NODE<5> and the sixth data node NODE<6> and have the child-parent relationship with the second data node NODE<2>.

In this state, since the fifth data node NODE<5> and the second data node NODE<2> adjacent to the seventh data node NODE<7> including the new data are included in the soft group, the seventh data node NODE<7> may also be included in the soft group.

That is, since the fifth data node NODE<5>, the sixth data node NODE<6>, and the seventh data node NODE<7> have the child-parent relationship with the second data node NODE<2>, the data of the fifth data node NODE<5>, the sixth data node NODE<6>, and the seventh data node NODE<7> may be considered as data adjacent to each other. Furthermore, all of the fifth data node NODE<5>, the sixth data node NODE<6>, and the seventh data node NODE<7> may be considered to have values adjacent to each other within a preset range. In this example, since the sixth data node NODE<6> is included in the hard group but the fifth data node NODE<5> and the second data node NODE<2> are included in the soft group, the seventh data node NODE<7> may be included in the soft group.

For reference, although the seventh data node NODE<7> is initially included in the soft group, the seventh data node NODE<7> may not be continuously included in the soft group, but changed to the hard group during the second sorting operation 1302 which is repeated afterwards.

During the above-described second sorting operation 1302, the data accessed a larger number of times than the preset number among the plurality of index data INDEX_DA<1:N> may be sorted into the soft group, and the data accessed a smaller number of times than the preset number may be sorted into the hard group.

As described with reference to FIGS. 14B and 14F, however, data adjacent to the data included in the soft group are highly likely to be accessed while the data include in the soft group are accessed.

Thus, for the data accessed a smaller number of times than the present number, data adjacent to the data included in the soft group and accessed a larger number of times than a predetermined number, among the data sorted into the hard group, may be additionally included in the soft group through the second sorting operation 302, the predetermined number being larger than the preset number. In this example, the data additionally included in the soft group may be separately sorted into an additional soft group, or not separately sorted but included in the existing soft group.

When the data additionally included in the soft group are separately sorted and the additional soft group is separately managed, the separating and saving operation 1303 of the memory system 110 having the configuration of FIG. 12B may be performed as follows. First, the memory system 110 may save the data included in the soft group into the volatile memory device 144. Then, the memory system 110 may save the data included in the additional soft group into the first region 152 of the non-volatile memory device 150. Furthermore, the memory system 110 may save the data included in the hard group into the second region 154 of the non-volatile memory device 150.

Figure 15A:
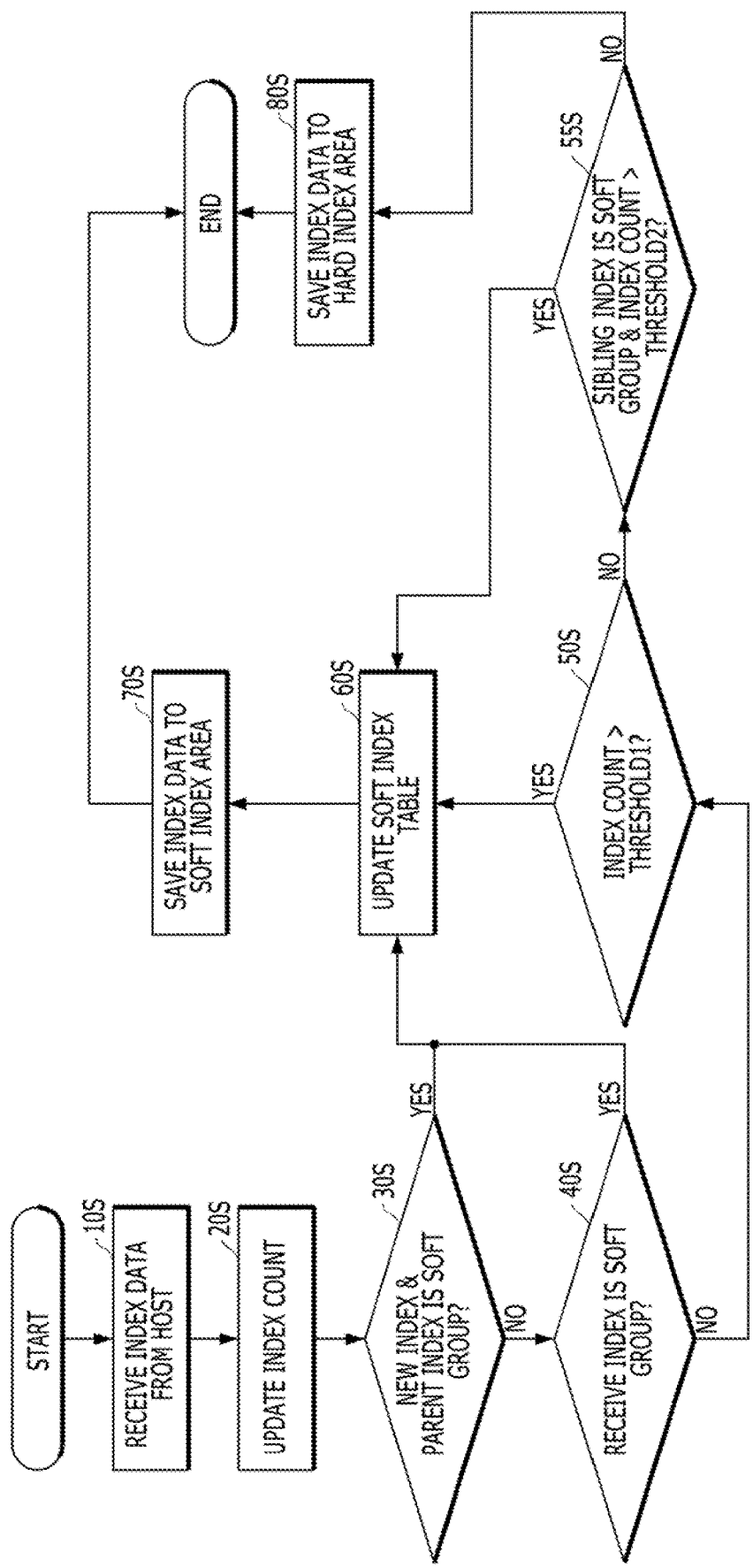
FIGS. 15A and 15B are flowcharts illustrating an example of a second data sorting operation, according to an embodiment of the invention.
Figure 15B:
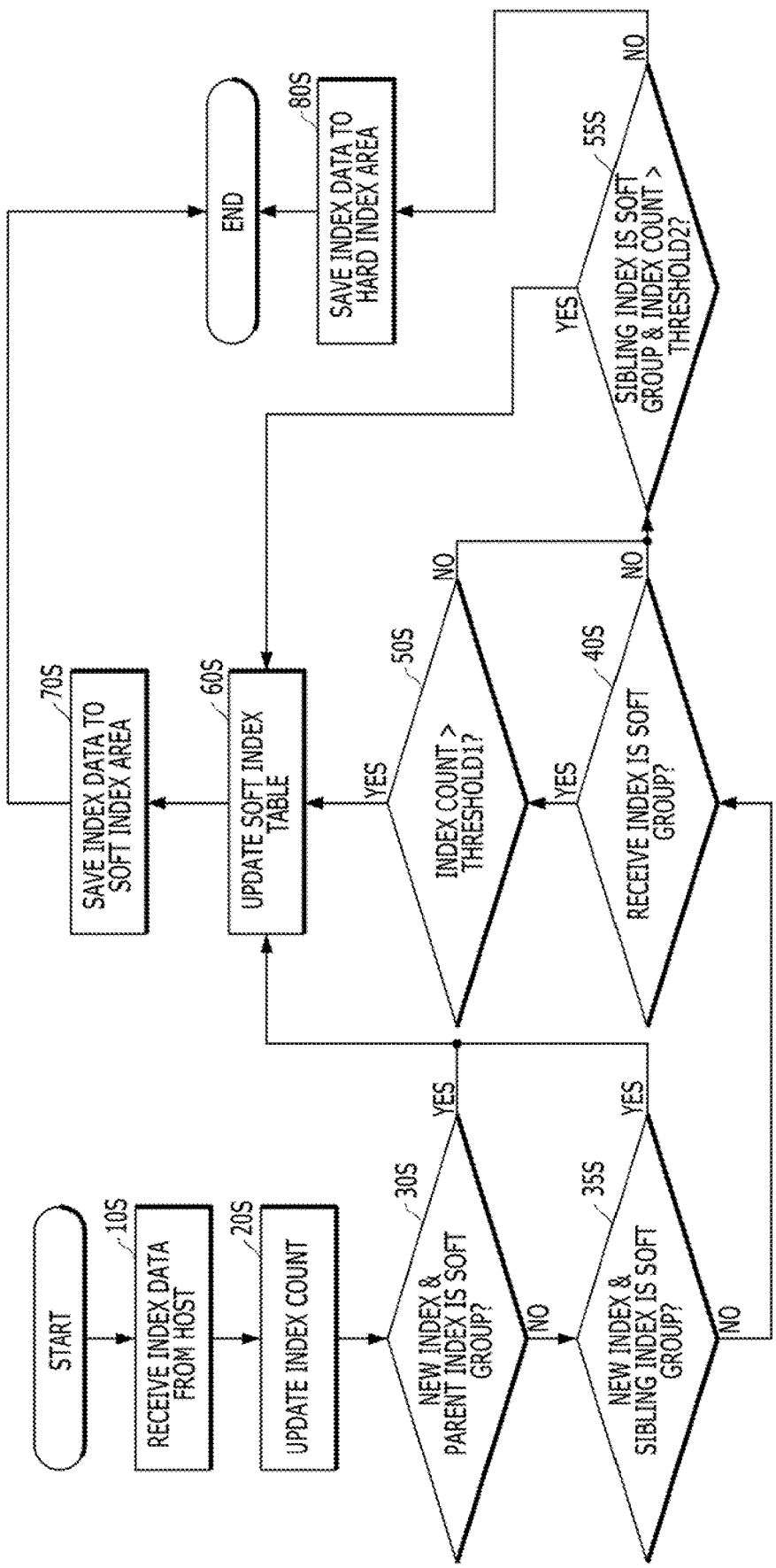

FIG. 15A and FIG. 15B are flowcharts for illustrating a second sorting operation according to an embodiment of the invention of the present invention. For example, the second sorting operation of FIG. 15A and FIG. 15B may be performed by the data processing system 100 illustrated in FIG. 12A to FIG. 12C.

First, it is assumed that the tree structure having the configuration illustrated in FIG. 14B is already completed at the point of time that the operations of FIG. 15A and FIG. 15B are started. That is, the operations of FIG. 15A and FIG. 15B may be considered as an operation for determining a data access which additionally occurs in the tree structure illustrated in FIG. 14B.

Referring to FIG. 15A, as index data are inputted from the host 102, the data processing system 100 may start operation at step 10S. For example, it is assumed that the index data included in the fifth data node NODE<5> in the tree structure illustrated in FIG. 14B were inputted from the host 102. This input may be referred to as a first input. Furthermore, it is assumed that the index data included in the sixth data node NODE<6> were inputted from the host 102. This input may be referred to as a second input. Furthermore, it is assumed that the index data included in the third data node NODE<3> were inputted from the host 102. This input may be referred to as a third input. Furthermore, as illustrated in FIG. 14C to FIG. 14F, new data may be inputted as the seventh data node NODE<7>. This input may be referred to as a fourth input.

The data processing system 100 may update an index count for the index data inputted from the host 102 with the start of the operation, at step 20S. For example, in the case of the first input, an access count for the fifth data node NODE<5> will be increased by one. In the case of the second input, an access count for the sixth data node NODE<6> will be increased by one. In the case of the third input, an access count for the third data node NODE<3> will be increased by one. In the case of the fourth input, an access count for the seventh data node NODE<7> will be increased by one while the seventh data node NODE<7> is newly generated.

Then, at step 30S, the data processing system 100 may check whether the index data inputted from the host 102 are new data and index data connected through the parent-child relationship are included in the soft group. In this situation, the cases of the first to third inputs may correspond to the case of NO. However, the case of the fourth input may correspond to the case of YES, and the data processing system 100 may include the index data inputted from the host 102 in the soft group at step 60S, and then save the index data included in the soft group into a specific storage region at step 70S. Then, the operation of the fourth input may be ended.

When it is the case of NO at step 30S as in the cases of the first to third inputs, the data processing system 100 may check whether the index data inputted from the host 102 are included in the soft group at step 40S. In this situation, the cases of the second and third inputs may correspond to the case of NO. However, the case of the first input may correspond to the case of YES. In this case, the data processing system 100 may include the index data inputted from the host 102 in the soft group at step 60S, and then save the index data included in the soft group into the specific storage region at step 70S. Then, the operation of the first input may be ended.

When it is the case of NO at step 40S as in the cases of the first and second inputs, the data processing system 100 may check whether the index count for the index data inputted from the host 102 exceeds a preset count THRESHOLD1 at step 50S. In this situation, when it is the case of YES at step 50S, the data processing system 100 may include the index data inputted from the host 102 in the soft group at step 60S, and then save the index data included in the soft group into the specific storage region at step 70S. Then, the corresponding operation may be ended.

On the other hand, when it is the case of NO at step 50S, the data processing system 100 may check whether the index data inputted from the host 102 are adjacent to the data included in the soft group and the index count exceeds a predetermined count THRESHHOLD2, at step 55S. In this situation, when the selection is YES, the data processing system 100 may include the index data inputted from the host 102 in the soft group at step 60S, and then save the index data included in the soft group into the specific storage region at step 70S. Then, the corresponding operation may be ended.

On the other hand, when it is the case of NO at step 55S, the data processing system 100 may set the index data inputted from the host 102 to the hard group, and save the index data included in the hard group into a separate storage region different from the specific storage region having the data included in the soft group are saved, at step 80S. Then, the corresponding operation may be ended.

When it is the case of YES at step 50S, the data processing system 100 may newly add the sixth data node NODE<6> and the third data node NODE<3> to the soft group at step 60S.

At step 55S, in the case of the second input, any one of YES and NO may be selected because the second data node NODE<2> and the fifth data node NODE<5> adjacent to the sixth data node NODE<6> are included in the soft group. When YES is selected, the sixth data node NODE<6> will be newly included in the soft group. When NO is selected, the sixth data node NODE<6> will continuously maintain the state having it is included in the hard group.

At step 55S, in the case of the third input, NO may be unconditionally selected because all of the data nodes NODE<1, 4> adjacent to each other are included in the hard group. Thus, the third data node NODE<3> will continuously maintain the state having it is included in the hard group.

The operation of FIG. 15B may further include one operation condition 35S for checking whether to sort the index data inputted from the host 102 into the soft group, in addition to the flowchart of FIG. 15A.

Specifically, in FIG. 15B, the data processing system 100 may check whether the index data inputted from the host 102 are new data and index data connected through the parent-child relationship are included in the soft group, at step 30S. Then, when it is the case of NO, the data processing system 100 may check whether the index data inputted from the host 102 are new data and index data having an adjacent value within a preset range are included in the soft group, at step 35S.

That is, the flowchart of FIG. 15A may include the operation 30S of checking whether the index data are included in the case of FIG. 14D, when the index data inputted from the host 102 are new data. That is, the flowchart of FIG. 15B may include the operations 30S and 35S of checking whether the index data are included in the case of FIG. 14F, when the index data inputted from the host 102 are new data.

Since the other operations of FIG. 15B excluding the above-described operation 35S are performed in the same manner as those of FIG. 15A, the detailed descriptions thereof are omitted herein.

For reference, although not illustrated in the drawings, the operation 30S of checking whether the index data inputted from the host 102 are new data and index data connected through the parent-child relationship are included in the soft group in the flowchart of FIG. 15A may be replaced with the operation 35S of checking whether the index data inputted from the host 102 are new data and index data having an adjacent value within the preset range are included in the soft group in the flowchart of FIG. 15B. When such a case is applied, the operation may indicate the operation 35S of checking whether the index data are included in the case of FIG. 14E.

Figure 16A:
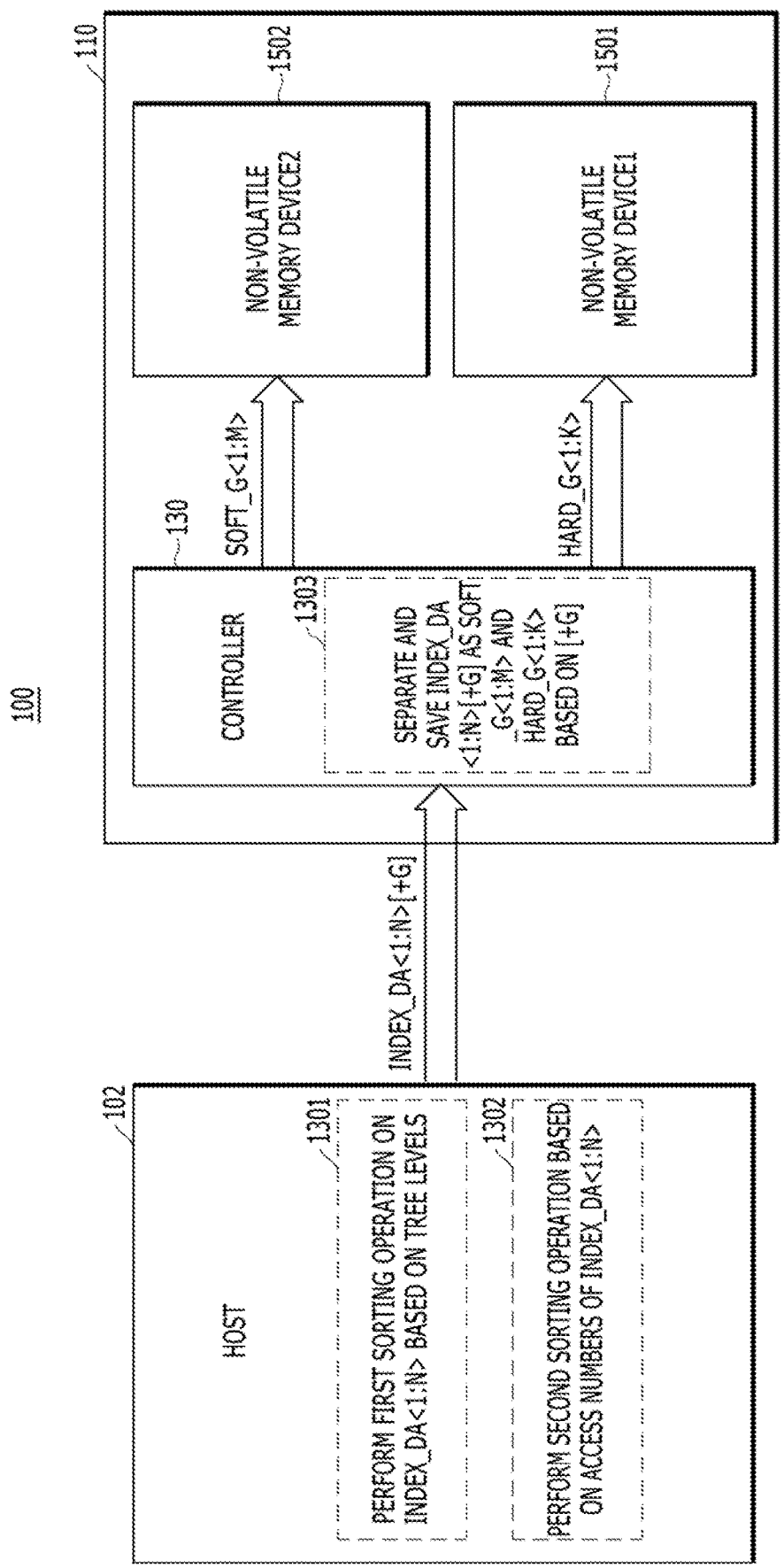
FIGS. 16A to 16C are block diagrams of a data processing system illustrating an operation of managing index data, according to another embodiment of the invention.
Figure 16B:
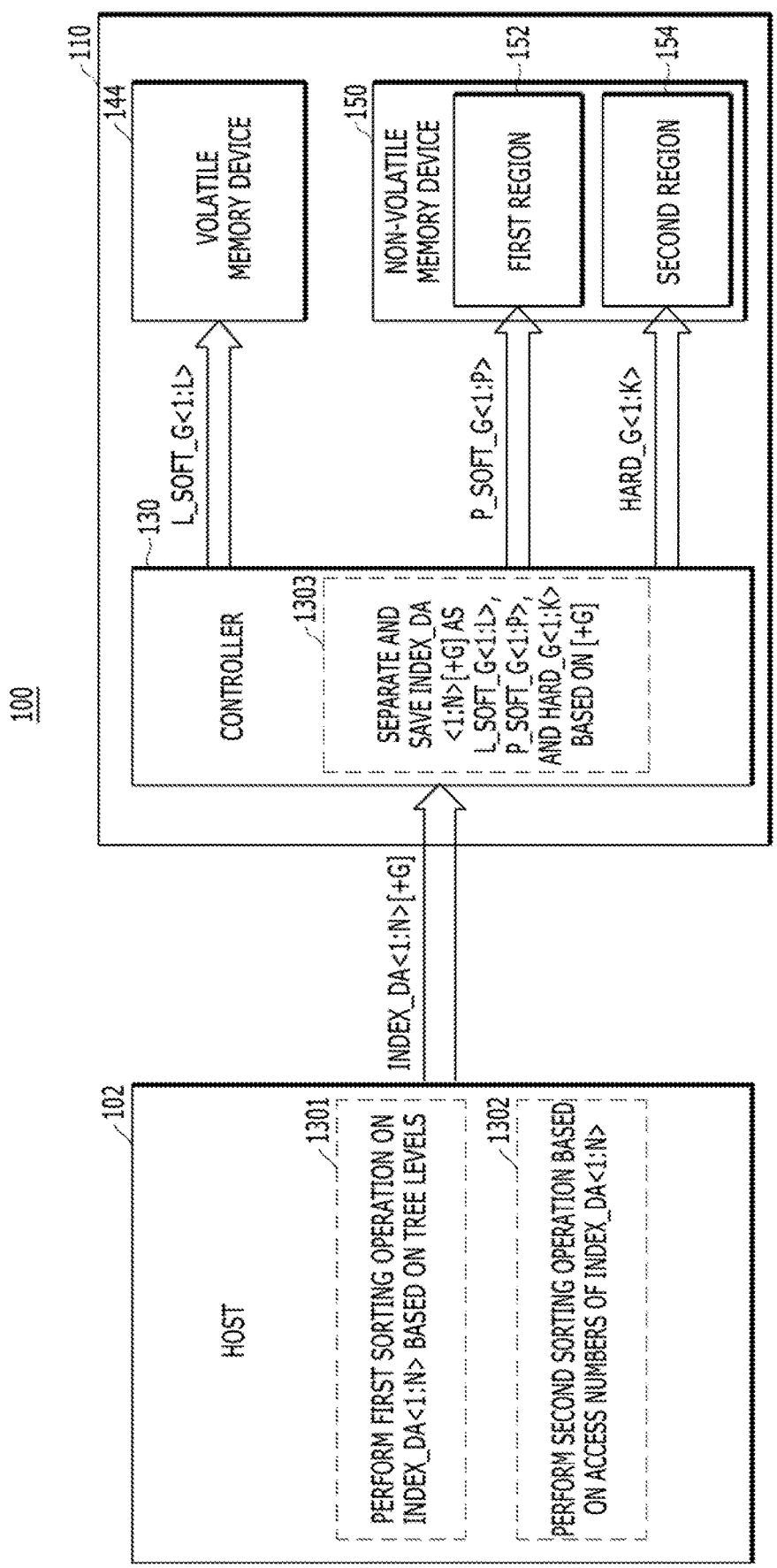
Figure 16C:
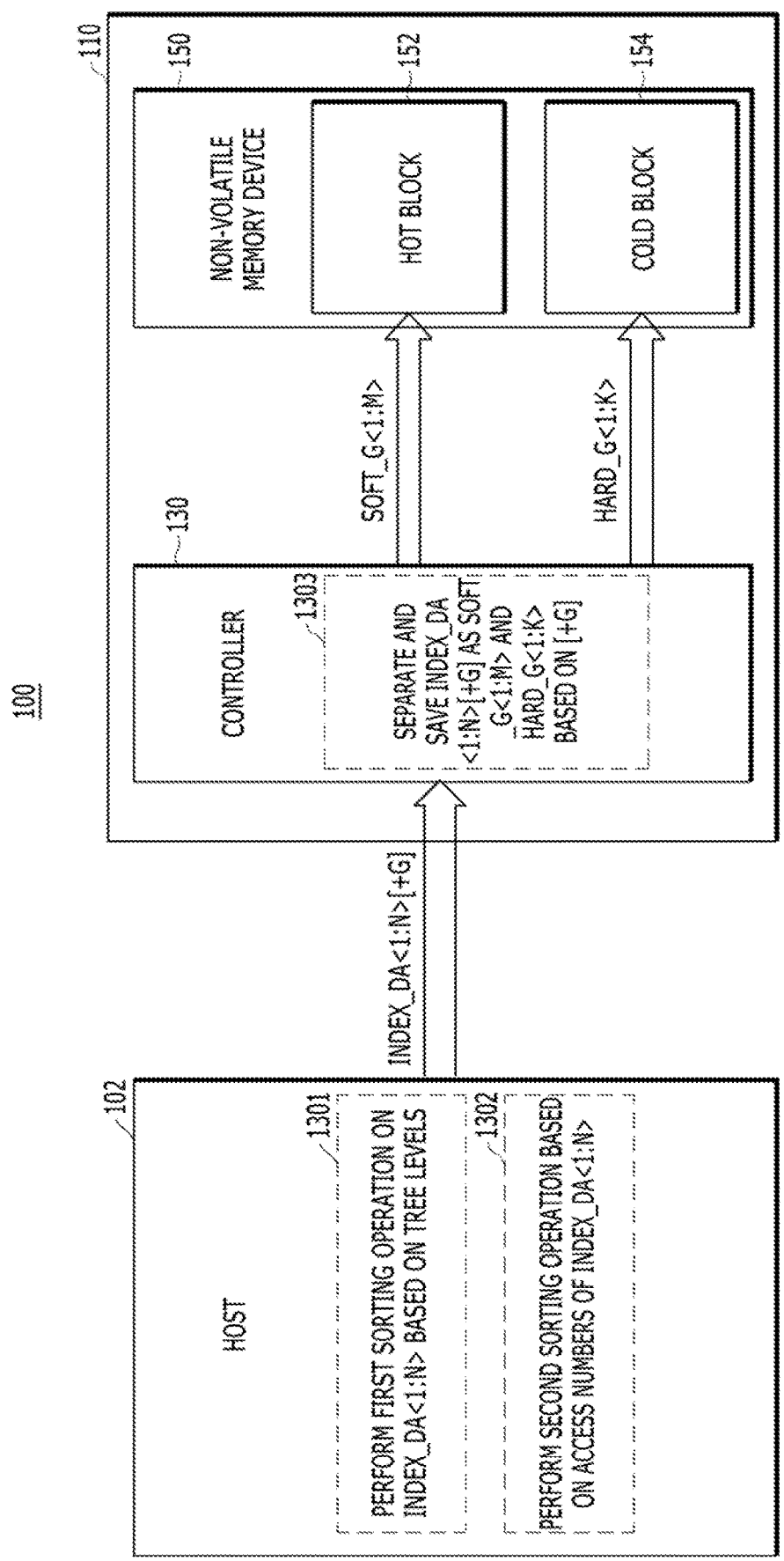

FIG. 16A to FIG. 16C are block diagrams of a data processing system for an operation of managing index data in accordance with another embodiment of the present invention. For example, the data processing system of FIG. 16A to FIG. 16C may be the data processing system 100 of FIG. 1.

Referring to FIG. 16A to FIG. 16C, the data processing system 100 may include a host 102 and a memory system 110. The memory system 110 illustrated in FIG. 16A may include a controller 130 and non-volatile memory devices 1501 and 1502. The memory system 110 illustrated in FIG. 16B may include a controller 130, a volatile memory device 144, and a non-volatile memory device 150. The memory system 110 illustrated in FIG. 16C may include a controller 130 and a non-volatile memory device 150.

In this example, since the operation of managing index data has been described with reference to FIGS. 12A to 12C, the detailed descriptions thereof are omitted herein.

FIG. 16A illustrates that the data processing system 100 in accordance with the embodiment of the present invention separates and save a plurality of index data INDEX_DA<1:N>[+G] managed in a tree structure by the host 102 into the plurality of non-volatile memory devices 1501 and 1502.

Specifically, each of the index data INDEX_DA<1:N> managed in a tree structure by the host 102 may include group information [+G] Indicating the group to which the index data belongs.

That is, the host 102 may perform a first sorting operation 1301 by sorting the plurality of index data INDEX_DA<1:N> based on the tree levels of the respective index data INDEX_DA<1:N>. Furthermore, the host 102 may perform a second sorting operation 1302 by sorting the plurality of index data INDEX_DA<1:N> based on the numbers of accesses to the respective index data INDEX_DA<1:N>. As the first and second sorting operations 1301 and 1302 are performed in the host 102, each of the index data INDEX_DA<1:N> transmitted to the memory system 110 from the host 102 may include group information [+G] indicating to which group SOFT_G<1:M> or HARD_G<1:K> the index data belongs.

The memory system 110 may perform a separating and saving operation 1303 by sorting the plurality of index data INDEX_DA<1:N> applied from the host 102 into a plurality of groups HARD_G<1:K> and SOFT_G<1:M> according to the group information [+G] of the respective index data INDEX_DA<1:N>, and separating and saving the groups HARD_G<1:K> and SOFT_G<1:M> into two non-volatile memory devices 1501 and 1502 which are different storage regions.

In this example, the memory system 110 may include the controller 130 and the first and second non-volatile memory devices 1501 and 1502. The first and second non-volatile memory devices 1501 and 1502 may be configured to have different operating speeds. For example, the first non-volatile memory device 1501 may be operated according to the MLC scheme, and the second non-volatile memory device 1502 may be operated according to the SLC scheme, such that the second non-volatile memory device 1502 is set to have higher operating speed than the first non-volatile memory device 1501.

Thus, the controller 130 may sort the plurality of index data INDEX_DA<1:N> into the plurality of groups HARD_G<1:K> and SOFT_G<1:M> in response to the group information [+G] included in the respective index data INDEX_DA<1:N>, and then separate and save the groups HARD_G<1:K> and SOFT_G<1:M> into the first and second non-volatile memory devices 1501 and 1502 through the separating and saving operation 1303.

For example, as illustrated in FIG. 16A, the memory system 110 may sort N index data INDEX_DA<1:N> into the two groups HARD_G<1:K> and SOFT_G<1:M> according to the group information [+G] included in the respective index data INDEX_DA<1:N>. Then, the memory system 110 may store K data included in the first group HARD_G<1:K> into the first non-volatile memory device 1501, and store M data included in the second group SOFT_G<1:M> into the second non-volatile memory device 1502.

FIG. 16B illustrates that the data processing system 100 in accordance with the embodiment of the present invention separates and saves the plurality of index data INDEX_DA<1:N>[+T] managed in a tree structure by the host 102 into the non-volatile memory device 150 and the volatile memory device 144.

Specifically, each of the index data INDEX_DA<1:N> managed in a tree structure by the host 102 may include group information [+G] indicating the group to which the index data belongs.

That is, the host 102 may perform a first sorting operation 1301 by sorting the plurality of index data INDEX_DA<1:N> based on the tree levels of the respective index data INDEX_DA<1:N>. The host 102 may perform a second sorting operation 1302 by sorting the plurality of index data INDEX_DA<1:N> based on the numbers of accesses to the respective index data INDEX_DA<1:N>. As the first and second sorting operations 1301 and 1302 are performed in the host 102, each of the index data INDEX_DA<1:N> transmitted to the memory system 110 from the host 102 may include group information [+G] indicating to which group L_SOFT_G<1:L>, P_SOFT_G<1:P>, or HARD_G<1:K> the index data belongs.

The memory system 110 may perform a separating and saving operation 1303 by sorting the plurality of index data INDEX_DA<1:N> applied from the host 102 into a plurality of groups L_SOFT_G<1:L>, P_SOFT_G<1:P>, and HARD_G<1:K> according to the group information [+G] of the respective index data INDEX_DA<1:N>, and separating and saving the groups L_SOFT_G<1:L>, P_SOFT_G<1:P>, and HARD_G<1:K> into the volatile memory device 144 and the non-volatile memory device 150 which are different storage regions.

In this example, the memory system 110 may include the controller 130, the volatile memory device 144 and the non-volatile memory device 150. The non-volatile memory device 150 may include first and second regions 152 and 154 which are different storage regions. The first and second regions 152 and 154 of the non-volatile memory device 150 may be configured to have different operating speeds. For example, the first region 152 may be operated according to the SLC scheme and the second region 154 may be operated according to the MCL scheme, such that the first region 152 is set to have a higher operating speed than the second region 154.

Thus, the controller 130 may sort the plurality of index data INDEX_DA<1:N> into the plurality of groups L_SOFT_G<1:L>, P_SOFT_G<1:P>, and HARD_G<1:K> in response to the group information [+G] included in the respective index data INDEX_DA<1:N>, and then separate and save plurality of groups L_SOFT_G<1:L>, P_SOFT_G<1:P>, and HARD_G<1:K> into the volatile memory device 144 and the first and second regions 152 and 154 of the non-volatile memory device 150 through the separating and saving operation 1303.

For example, as illustrated in FIG. 16B, the memory system 110 may sort N index data INDEX_DA<1:N> into three groups L_SOFT_G<1:L>, P_SOFT_G<1:P>, and HARD_G<1:K> according to the group information [+g] included in the respective index data INDEX_DA<1:N>. Then, the memory system 110 may save K data included in the group HARD_G<1:K> into the second region 154 of the non-volatile memory device 150, save P data included in the group P_SOFT_G<1:P> into the first region 152 of the non-volatile memory device 150, and save L data included in the group L_SOFT_G<1:L> into the volatile memory device 144.

FIG. 16C illustrates that the data processing system 100 in accordance with the embodiment of the present invention separates and saves the plurality of index data INDEX_DA<1:N>[+T] managed in a tree structure by the host 102 into different regions of the non-volatile memory device 150.

Specifically, each of the index data INDEX_DA<1:N> managed in a tree structure by the host 102 may include group information [+G] indicating the group to which the index data belongs.

That is, the host 102 may perform a first sorting operation 1301 by sorting the plurality of index data INDEX_DA<1:N> based on the tree levels of the respective index data INDEX_DA<1:N>. Furthermore, the host 102 may perform a second sorting operation 1302 by sorting the plurality of index data INDEX_DA<1:N> based on the numbers of accesses to the respective index data INDEX_DA<1:N>. As the first and second sorting operations 1301 and 1302 are performed in the host 102, each of the index data INDEX_DA<1:N> transmitted to the memory system 110 from the host 102 may include group information [+G] indicating to which group SOFT_G<1:M> or HARD_G<1:K> the index data belongs.

The memory system 110 may perform a separating and saving operation 1303 by sorting the plurality of index data INDEX_DA<1:N> applied from the host 102 into a plurality of groups SOFT_G<1:M> and HARD_G<1:K> according to the group information [+G] of the respective index data INDEX_DA<1:N>, and saving the groups SOFT_G<1:M> and HARD_G<1:K> into a plurality of blocks 152 and 154 within the non-volatile memory device 150.

In this example, the memory system 110 may include the controller 130 and the non-volatile memory device 150. The non-volatile memory device 150 may include a hot block 152 and a cold block 154.

Thus, the controller 130 may sort the plurality of index data INDEX_DA<1:N> into the plurality of groups SOFT_G<1:M> and HARD_G<1:K> in response to the group information [+G] included in the respective index data INDEX_DA<1:N>, and then separate and save the groups SOFT_G<1:M> and HARD_G<1:K> into the hot block 152 and the cold block 154 of the non-volatile memory device 150 through the separating and saving operation 1303.

For example, as illustrated in FIG. 16C, the memory system 110 may sort N index data INDEX_DA<1:N> into the two groups SOFT_G<1:M> and HARD_G<1:K> according to the group information [+G] included in the respective index data INDEX_DA<1:N>. Then, the memory system 110 may save M data included in the group SOFT_G<1:M> into the hot block 152 of the second non-volatile memory device 150, and save K data included in the first group HARD_G<1:K> into the cold block 154 of the non-volatile memory device 150.

For reference, the first and second sorting operations 1301 and 1302 which are used to manage index data in the data processing systems illustrated in FIG. 16A to FIG. 16C may be performed in the same manner as the first and second sorting operations 1301 and 1302 described with reference to FIG. 14A to FIG. 14F, FIG. 15A and FIG. 15B. Thus, the detailed descriptions thereof are omitted herein.

When the above-described embodiments of the present invention are applied, the plurality of index data INDEX_DA<1:N> managed in a tree structure may be sorted into the plurality of groups through the first sorting operation 1301 by sorting the index data based on the tree levels thereof and the second sorting operation 1302 by sorting the index data based on the numbers of accesses to the respective index data, and separated and saved into different storage regions. Through this operation, the index data may be more efficiently and quickly accessed.

According to various embodiments of the invention, the data processing system may sort a plurality of index data managed in a tree structure into a plurality of groups through a first and second sorting operations based on their respective tree levels and the number of accesses to their respective index data. The first sorting operation may sort the plurality of index data based on their respective tree levels. The second sorting operation may sort the plurality of index data based on the number of accesses to their respective index data. The data processing system may then sort the groups into different storage regions.

The data processing system according to the invention may access data more efficiently and/or quickly than existing data processing systems.

Although various embodiments have been described for illustrative purposes, it will be apparent to those skilled in the art that various changes and modifications may be made without departing from the spirit and scope of the invention as defined in the following claims.

For example, the positions and types of the logic gates and transistors used in the above-described embodiments may be set in different manners according to the polarities of input signals.

What is claimed is:

1. A data processing system comprising:
a host suitable for managing a plurality of index data, each including a tree structure, wherein respective index data comprises tree level information; and
a memory system comprising a memory and a processor configured for:
receiving the plurality of index data;
classifying the plurality of index data into a plurality of groups, each indicative of a different level of access, through a first sorting operation based on the tree level information and a second sorting operation based on a number of accesses to the respective index data,
wherein the first sorting operation comprises:
checking the tree level information contained in the respective index data, and
sorting the plurality of index data into a leaf group comprising index data having the deepest tree level, a parent group comprising index data connected to the index data included in the leaf group through a parent-child relationship, and a rest group comprising all remaining index data other than the index data included in the leaf and the parent groups;
wherein after the first sorting operation sorts the plurality of index data, the second sorting operation sorts the plurality of index data by comparing the number of accesses for each index data of the plurality of index data to a preset number;
saving the groups into different storage regions having different operating speeds corresponding to the different levels of access respectively; and
accessing each of the groups according to the corresponding access level and operating speed of the corresponding storage region.

2. The data processing system of claim 1, wherein the second sorting operation comprises:
checking the number of accesses to the respective index data, and
sorting the plurality of index data into either a soft group formed by grouping index data accessed a larger number of times than the preset number or a hard group formed by grouping index data accessed a smaller number of times than the preset number.

3. The data processing system of claim 2, wherein the second sorting operation for new index data among the plurality of index data comprises sorting the new index data into the soft group, when any one of index data adjacent to the new index data is included in the soft group, regardless of the number of accesses to the new index data.

4. The data processing system of claim 3, wherein the adjacent index data comprises one of:
index data of the leaf group having a value within a preset range from the value of the new index data,
index data of the parent group being connected to the new index data through the parent-child relationship, and
index data of the leaf group being connected to the index data of the parent group through the parent-child relationship,
index data of the parent group being connected to the new index data through the parent-child relationship.

5. The data processing system of claim 4, wherein the memory system comprises:
a first non-volatile memory device;
a second non-volatile memory device; and
a controller suitable for;
classifying the plurality of index data into the groups through the first and second sorting operations,
saving index data included in the soft group into the second non-volatile memory device, and
saving index data included in the hard group into the first non-volatile memory device.

6. The data processing system of claim 4, wherein the memory system comprises:
a non-volatile memory device comprising first and second regions;
a volatile memory device; and
a controller suitable for;
classifying the plurality of index data into the groups through the first and second sorting operations,
saving index data included in both of the leaf group and the soft group into the volatile memory device,
saving index data included in both of the parent group and the soft group into the first region of the non-volatile memory device, and
saving index data included in the hard group into the second region of the non-volatile memory device.

7. The data processing system of claim 4, wherein the second sorting operation comprises sorting a part of the index data sorted into the hard group into an additional soft group, the part of the index data being accessed a larger number of times than a predetermined number while having a value within a preset range from the index data included in the soft group, the predetermined number is lower than the preset number.

8. The data processing system of claim 7, wherein the memory system comprises:
a non-volatile memory device comprising first and second regions;
a volatile memory device; and
a controller suitable for;
classifying the plurality of index data into the groups through the first and second sorting operations,
saving index data included in the soft group into the volatile memory device,
saving index data included in the additional soft group into the first region of the non-volatile memory device, and
saving index data included in the hard group into the second region of the non-volatile memory device.

9. The data processing system of claim 4, wherein the memory system comprises:
a non-volatile memory device comprising a hot block and a cold block; and
a controller suitable for;
classifying the plurality of index data into the groups through the first and second sorting operations,
saving index data included in the soft group into the hot block of the non-volatile memory device, and
saving index data included in the hard group into the cold block of the non-volatile memory device.

10. A data processing system comprising:
a host suitable for:
managing a plurality of index data, each including a tree structure; and
classifying the plurality of index data into a plurality of groups, each indicative of a different level of access, through a first sorting operation based on the tree level information and a second sorting operation based on a number of accesses to the respective index data,
wherein the first sorting operation comprises sorting the plurality of index data into a leaf group formed by grouping index data having the deepest tree level, a parent group formed by grouping index data connected to the index data included in the leaf group through the parent-child relationship, and a rest group formed by grouping rest index data excluding the index data included in the leaf group and the parent group;

wherein after the first sorting operation sorts the plurality of index data, the second sorting operation sorts the plurality of index data by comparing the number of accesses for each index data of the plurality of index data to a preset number;

wherein the plurality of index data each contain group information indicating information on a group to which the index data belongs; and a memory system comprising a memory and a processor configured for:

receiving the plurality of index data;

sorting the plurality of index data applied from the host into a plurality of groups according to the group information of the respective index data;

separating and saving the groups into different storage regions having different operating speeds corresponding to the different levels of access respectively; and accessing each of the groups according to the corresponding access level and operating speed of the corresponding storage region.

11. The data processing system of claim 10, wherein the second sorting operation comprises:

checking the numbers of accesses to the respective index data, and sorting the plurality of index data into either a soft group formed by grouping index data accessed a larger number of times than the preset number or a hard group formed by grouping index data accessed a smaller number of times than the preset number.

12. The data processing system of claim 11, wherein the second sorting operation for new index data among the plurality of index data comprises sorting the new index data into the soft group, when any one of index data adjacent to the new index data is included in the soft group, regardless of the number of accesses to the new index data.

13. The data processing system of claim 12, wherein the adjacent index data comprises one of:

index data of the leaf group which has a value within a preset range from the value of the new index data, index data of the parent group which is connected to the new index data through the parent-child relationship, and index data of the leaf group which is connected to the index data of the parent group through the parent-child relationship, index data of the parent group being connected to the new index data through the parent-child relationship.

14. The data processing system of claim 13, wherein the memory system comprises:

a first non-volatile memory device;

a second non-volatile memory device; and a controller suitable for;

saving the index data included in the soft group into the second non-volatile memory device, and saving the index data included in the hard group into the first non-volatile memory device, according to the group information contained in the respective index data.

15. The data processing system of claim 13, wherein the memory system comprises:

a non-volatile memory device comprising first and second regions;

a volatile memory device; and a controller suitable for;

saving index data included in both of the leaf group and the soft group into the volatile memory device, saving index data included in both of the parent group and the soft group into the first region of the non-volatile memory device, and saving index data included in the hard group into the second region of the non-volatile memory device, according to the group information contained in the respective index data.

16. The data processing system of claim 13, wherein the second sorting operation comprises sorting a part of the index data sorted into the hard group into an additional soft group, the part of the index data being accessed a larger number of times than a predetermined number while having a value within a preset range from the index data included in the soft group, the predetermined number is lower than the preset number.

17. The data processing system of claim 16, wherein the memory system comprises:

a non-volatile memory device comprising first and second regions;

a volatile memory device; and a controller suitable for;

saving the index data included in the soft group into the volatile memory device, saving the index data included in the additional soft group into the first region of the non-volatile memory device, and saving the index data included in the hard group into the second region of the non-volatile memory device, according to the group information contained in the respective index data.

18. The data processing system of claim 13, wherein the memory system comprises:

a non-volatile memory device comprising a hot block and a cold block; and a controller suitable for;

saving the index data included in the soft group into the hot block of the non-volatile memory device, and saving the index data included in the hard group into the cold block of the non-volatile memory device, according to the group information contained in the respective index data.

* * * * *